United States Patent
Choukir et al.

(10) Patent No.: US 11,483,283 B1
(45) Date of Patent: Oct. 25, 2022

(54) DHCP RESOURCE OPTIMIZATION FOR RANDOMIZED AND CHANGING MAC ADDRESS

(71) Applicant: Cisco Technology, Inc., San Jose, CA (US)

(72) Inventors: Amine Choukir, Lausanne VD (CH); Robert E. Barton, Richmond (CA); Jerome Henry, Pittsboro, NC (US); Carlos M. Pignataro, Cary, NC (US); Domenico Ficara, Essertines-sur-Yverdon (CH); Vincent Cuissard, Eteaux (FR); Anirban Karmakar, Ecublens (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/546,902

(22) Filed: Dec. 9, 2021

Related U.S. Application Data

(60) Provisional application No. 63/203,586, filed on Jul. 27, 2021.

(51) Int. Cl.
*G06F 15/16* (2006.01)
*H04L 61/5014* (2022.01)
(Continued)

(52) U.S. Cl.
CPC ........ *H04L 61/5014* (2022.05); *H04L 61/251* (2013.01); *H04W 8/005* (2013.01); *H04L 2101/622* (2022.05)

(58) Field of Classification Search
None
See application file for complete search history.

(56) References Cited

U.S. PATENT DOCUMENTS 10,237,738 B2 3/2019 Lee et al.
10,454,887 B2 10/2019 Weis et al.
(Continued)

FOREIGN PATENT DOCUMENTS

DE 102015204210 A1 9/2016
EP 1379029 A1 1/2004
(Continued)

OTHER PUBLICATIONS

Ansley et al., "Proposal for New Action Frame to Aid Mac Randomization Handling," IEEE 802.11-19/0179r3, Jul. 2019, 9 pages.
(Continued)

*Primary Examiner* — Phyllis A Book
(74) *Attorney, Agent, or Firm* — Edell, Shapiro & Finnan, LLC

(57) ABSTRACT

A wireless infrastructure that communicates with a DHCP server and a wireless client that rotates its MAC address performs a method including: upon receiving, from the wireless client, a first request with a first MAC address, creating a session context including the first MAC address and a stable identifier, and relaying the first request to the DHCP server; relaying, from the DHCP server to the wireless client, a first DHCP reply that includes an Internet Protocol (IP) address bound to the stable identifier; upon receiving, from the wireless client, a second request with the IP address and a second MAC address, merging the second MAC address and the IP address into the session context, and relaying, to the DHCP server, the second request including the stable identifier; and relaying, from the DHCP server to the wireless client, a second DHCP reply including the IP address bound to the stable identifier.

20 Claims, 12 Drawing Sheets

(51) Int. Cl.
   *H04W 8/00* (2009.01)
   *H04L 61/251* (2022.01)
   *H04L 101/622* (2022.01)

(56) References Cited

U.S. PATENT DOCUMENTS

| | | | |
|---|---|---|---|
| 10,820,202 B1 | 10/2020 | Gundavelli | |
| 2005/0105529 A1* | 5/2005 | Arberg | H04L 61/5014 370/395.5 |
| 2005/0114492 A1* | 5/2005 | Arberg | H04L 61/5014 709/246 |
| 2007/0091842 A1* | 4/2007 | Siddiqi | H04W 48/14 370/331 |
| 2007/0203990 A1* | 8/2007 | Townsley | H04L 63/0892 709/206 |
| 2008/0008129 A1* | 1/2008 | Nagarajan | H04W 8/08 370/331 |
| 2008/0071890 A1* | 3/2008 | Meier | H04L 61/5014 709/220 |
| 2009/0210518 A1* | 8/2009 | Verma | H04L 61/103 709/220 |
| 2010/0061309 A1* | 3/2010 | Buddhikot | H04L 61/251 370/328 |
| 2011/0004913 A1* | 1/2011 | Nagarajan | H04L 63/102 726/1 |
| 2012/0213211 A1 | 8/2012 | Remaker | |
| 2013/0166737 A1* | 6/2013 | Christenson | H04L 61/103 709/224 |
| 2013/0201979 A1* | 8/2013 | Iyer | H04L 12/4679 370/338 |
| 2015/0063205 A1 | 3/2015 | Elliott | |
| 2015/0208304 A1* | 7/2015 | Forte | H04W 36/0011 370/312 |
| 2016/0080315 A1 | 3/2016 | Anggawijaya et al. | |
| 2016/0269359 A1 | 9/2016 | Adrangi et al. | |
| 2016/0302058 A1 | 10/2016 | Mestanov et al. | |
| 2017/0142064 A1 | 5/2017 | Weis et al. | |
| 2018/0324142 A1 | 11/2018 | Adrangi et al. | |
| 2019/0386955 A1 | 12/2019 | Weis et al. | |
| 2020/0229071 A1 | 7/2020 | Ansley et al. | |
| 2020/0244655 A1 | 7/2020 | Gundavelli et al. | |
| 2020/0344203 A1 | 10/2020 | Mermoud et al. | |
| 2021/0036988 A1 | 2/2021 | McKibben et al. | |
| 2021/0168115 A1 | 6/2021 | de la Oliva et al. | |
| 2022/0038454 A1* | 2/2022 | Kuarsingh | H04L 63/20 |

FOREIGN PATENT DOCUMENTS

| | | | |
|---|---|---|---|
| EP | 1732265 A1 | 12/2006 | |
| EP | 3091715 A1 * | 11/2016 | H04L 12/66 |
| JP | 2009500918 A * | 1/2009 | H04L 61/5014 |
| WO | 2016/114843 A2 | 7/2016 | |
| WO | 2020000430 A1 | 1/2020 | |
| WO | 2020/010126 A1 | 9/2020 | |

OTHER PUBLICATIONS

Marks, "IEEE Std 802c: What's New and Useful in the Overview and Architecture," IEEE 802.1 Contribution, Sep. 2017, 42 pages.
Slashdot, "Did MacOS Stop Allowing Changes to Wifi MAC Addresses?," https://mobile.slashdot.org/story/19/10/06/177216/did-macos-stop-allowing-changes-to-wifi-mac-addresses, Apr. 5, 2021, 8 pages.
Volz, et al., "Link-Layer Addresses Assignment Mechanism for DHCPv6," draft-bvtm-dhc-mac-assign-02, Dynamic Host Configuration (DHC), Internet-Draft, Oct. 20, 2018, 18 pages.
Lee, et al., "Problem Statements for MAC Address Randomization," draft-lee-randomized-macaddr-ps-01 Internet Engineering Task Force, Internet-Draft, Sep. 22, 2020, 6 pages.
Ansley, "IEEE P802.11—Randomized and Changing MAC Address (RCM) Study Group (SG)—Meeting Update," https://www.ieee802.org/11/Reports/rcmtig_update.htm, Apr. 5, 2021, 2 pages.
Stretch, "MAC Address Aggregation and Translation as an Alternative to L2 Overlays," https://packetlife.net/blog/2014/nov/18/mac-address-aggregation-and-translation/, Nov. 18, 2014, 9 pages.
Wang, et al., "MAC Address Translation for Enabling Scalable Virtual Private LAN Services?," 21st International Conference on Advanced Information Networking and Applications Workshops (AINAW'07), May 2007, 6 pages.
Android Open Source Project, "Privacy: MAC Randomization," retrieved from https://source.android.com/devices/tech/connect/wifi-mac-randomization, on Dec. 4, 2020, 4 pages.
Bellovin et al., "Privacy-Enhanced Searches Using Encrypted Bloom Filters," Columbia University Computer Science Technical Reports, CUCS-034-07, Apr. 27, 2011, 16 pages.
Razaque, et al., "Restoring the privacy and confidentiality of users over Mobile collaborative learning (MCL) environment," IEEE Transaction Latin America, vol. 9, No. 7, Dec. 2011, 13 pages.
Alibaba Cloud, "The principle of Arp-nat (MAC Address translation)," https://topic.alibabacloud.com/a/the-principle-of-arp-nat-mac-address-translation_8_8_30147619.html, Nov. 2017, 7 pages.
Wi-Fi Alliance, "WPA3™ Specification," Version 3, WPA3™ Specification Version 3.0, https://www.wi-fi.org/file/wpa3-specification, Dec. 20, 2019, 30 pages.
Huitema, "Unique Identifiers in DHCP options enable device tracking," draft-huitema-perpass-dhcp-identifiers-00.txt, Internet Engineering Task Force (IETF), Network Working Group, Internet-Draft, Mar. 13, 2014, 6 pages.
Leach, et al., "A Universally Unique IDentifier (UUID) URN Namespace," The Internet Society, Network Working Group, Request for Comments: 4122, Jul. 2005, 32 pages.
Droms, et al., "Dynamic Host Configuration Protocol for IPv6 (DHCPv6)," The Internet Society, Network Working Group, Request for Comments: 3315, Jul. 2003, 101 pages.
Alexander, et al., "DHCP Options and BOOTP Vendor Extensions," Network Working Group, Request for Comments: 2132, Mar. 1997, 34 pages.
Android Open Source Project, "Implementing MAC Randomization," https://source.android.com/devices/tech/connect/wifi-mac-randomization, Dec. 2, 2021, 3 pages.
802.11 WG—Wireless LAN Working Group, "Modifications to IEEE Std 802.11™-2016, above the physical layer (PHY), to enable delivery of preassociation service discovery information to IEEE 802.11 stations (STAs) are defined in this amendment., above the physical layer (PHY), to enable delivery of preassociation service discovery information to IEEE Std 802.11 stations (STAs).," https://standards.ieee.org/standard/802_11aq-2018.html, Published Date: Aug. 31, 2018, 5 pages.
Ciotti, et al., "TGi Dallas Interim Meeting Minutes—Jan. 2002," LinCom Wireless, Wireless LANs, doc.: IEEE 802.11-02/028r0, Jan. 2002, 34 pages.

* cited by examiner

Session (DHCP) Context 1100

| Stable ID | IP Addr | MAC Addr |
|-----------|---------|----------|
| IDx/ELI1  | IPx     | RMAC1    |
| IDx/ELI1  | IPx     | RMAC2    |

1102
1104

MAC Rotation

FIG.11A

Session (SLAAC) Context 1120

| RMAC1 | LLAx       |
|-------|------------|
| RMAC1 | GAx        |
| RMAC2 | LLAx, GAx  |

1122
1124

MAC Rotation

FIG.11B

DHCP RESOURCE OPTIMIZATION FOR RANDOMIZED AND CHANGING MAC ADDRESS

CROSS REFERENCE TO RELATED APPLICATION

This application claims priority to U.S. Provisional Application No. 63/203,586, filed Jul. 27, 2021, the entirety of which is incorporated herein by reference.

TECHNICAL FIELD

The present disclosure relates to secure networking.

BACKGROUND

Randomized and changing media access control (MAC) (RCM) address techniques have been used by wireless client devices (also referred to herein simply as "wireless clients") for some time. Wireless clients rotate their MAC addresses for privacy reasons, and to avoid being tracked. When a wireless client rotates its MAC address while engaged in a communication session with a wireless infrastructure, the MAC address rotation may cause an undesired momentary disassociation from the wireless infrastructure. Such disassociation may also disrupt wired connectivity for the communication session between the wireless infrastructure and a wired network. Conventional RCM techniques do not support MAC address rotation within a single communication session, without disassociation from the wireless infrastructure. Moreover, current IEEE 802.11 specifications do not provide for such operation.

BRIEF DESCRIPTION OF THE DRAWINGS

FIG. 11A is an illustration of a session context for the RCM DHCP techniques, according to an example embodiment.

FIG. 11B is an illustration of a session context for the SLAAC technique, according to an example embodiment.

DESCRIPTION OF EXAMPLE EMBODIMENTS

Overview

In a first embodiment, a wireless infrastructure configured to communicate with a dynamic host configuration protocol (DHCP) server and a wireless client that rotates its media access control (MAC) address performs a method including: upon receiving, from the wireless client, a first DHCP request that includes a first MAC address, creating, for the wireless client, a session context that includes the first MAC address and a stable identifier for the wireless client that is stable across MAC address rotations, and relaying the first DHCP request to the DHCP server; relaying, from the DHCP server to the wireless client, a first DHCP reply that includes an Internet Protocol (IP) address bound to the stable identifier; upon receiving, from the wireless client, a second DHCP request that asserts the IP address and a second MAC address due to a MAC address rotation, merging the second MAC address and the IP address into the session context with the stable identifier, and relaying, to the DHCP server, the second DHCP request to include the stable identifier; and relaying, from the DHCP server to the wireless client, a second DHCP reply that includes the IP address bound to the stable identifier.

In a second embodiment, a method is performed at a wireless infrastructure configured to support stateless address autoconfiguration (SLAAC) IP address assignment to a wireless client hosted on a subnet and configured to rotate its MAC address. The method includes: upon observing a packet sent by the wireless client to the subnet for duplicate address detection, the packet including a link local address (LLA) and a first MAC address, recording a mapping of the first MAC address to the LLA in a session context for the wireless client; upon observing a router advertisement from a router advertising a subnet prefix for the subnet, computing a global IP address based on the subnet prefix and the link local address, and recording a mapping of the first MAC address to the global IP address in the session context; and upon observing data packets sent by the wireless client to the router and that include a second MAC address due to a MAC address rotation, the link local address, and the global IP address, recording a mapping of the second MAC address to the LLA and the global IP address in the session context, to persist the session context across the MAC address rotation.

EXAMPLE EMBODIMENTS

Figure 1:
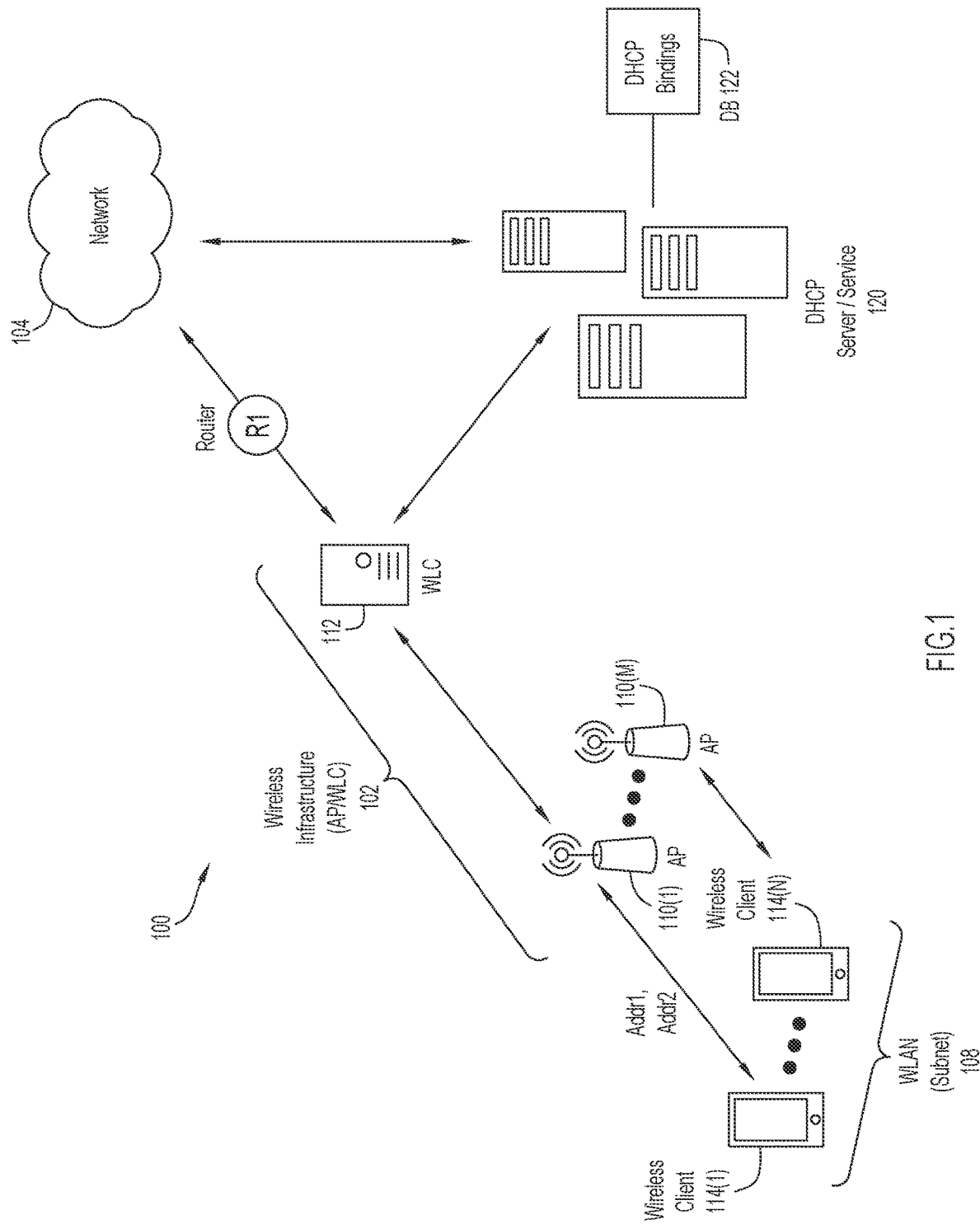
FIG. 1 is block diagram of a network environment in which embodiments for handling MAC address rotation during a communication session may be implemented, accordance to an example embodiment.

With reference to FIG. 1, there is a block diagram of an example network environment 100 in which embodiments for handling MAC address rotation may be implemented. Network environment 100 includes a wireless infrastructure (also referred to as a "wireless access network") 102 connected to and configured to communicate with a network 104 through a router R1, and a WLAN 108. Network 104 may include one or more wide area networks (WANs), such as the Internet, and one or more LANs. Wireless infrastructure 102 includes wireless APs 110(1)-110(M) (collectively referred to as "APs 110") that serve WLAN 108, and a WLC 112 configured to control the APs and provide connectivity to network 104 through router R1, which may serve as a gateway for the WLAN to the network. In the ensuing description and in the figures, the terms "wireless infrastructure" and "AP/WLC" may be used synonymously and interchangeably. APs 110 provide wireless connectivity to wireless client devices 114(1)-114(N) (collectively referred to as "wireless clients 114") on WLAN 108. Wireless clients 114 access WLC 112 and network 104 wirelessly through APs 110. Wireless clients 114 associate/connect to wireless infrastructure 102 and are authenticated under control of WLC 112 in order to establish wireless communication sessions with the wireless infrastructure and network 104. Wireless clients 114 may exchange packets with network 104 through APs 110 and WLC 112 during the communication sessions, in which case the WLC forwards the packets between the network and the wireless clients. In this way, wireless infrastructure 102 (and router R1) serves as a bridge to transport traffic (e.g., data packets) between network 104 and WLAN 108.

Network environment 100 further includes a DHCP server 120 that communicates with WLC 112 over network 104, for example. DHCP server 120 may include a DHCP application or service hosted on or implemented by one or more servers connected to network 104. DHCP server 120 manages a pool of IP addresses (also referred to as a "DHCP address pool") and assigns or allocates the IP addresses to wireless clients 114 for their communication sessions based on client identifiers (e.g., MAC addresses or other identifiers of the wireless clients as described herein) presented to the DHCP server. Wireless clients 114 and DHCP server 120 exchange DHCP messages by which the wireless clients request, and the DHCP server assigns to the wireless clients, IP addresses from the DHCP address pool. DHCP messages sent by wireless clients 114 to DHCP server 120 through wireless infrastructure 102 and network 104 are generally referred to herein as "requests," and DHCP messages sent by the DHCP server to the wireless clients through the wireless infrastructure and the network are generally referred to herein as "responses" or "replies." In the example of FIG. 1, wireless infrastructure 102 (e.g., WLC 112) observes (i.e., "snoops") and relays (i.e., forwards) the DHCP requests and responses between DHCP server 120 and wireless clients 114. When wireless infrastructure 102 observes/snoops a DHCP message, the wireless infrastructure examines, and may access, relevant content in the DHCP message, to implement embodiments presented herein.

When DHCP server 120 assigns IP addresses to requesting wireless clients 114 based on their client identifiers, the DHCP server records (i.e., stores) DHCP bindings in entries of a database 122 that map the assigned IP addresses to corresponding client (device) identifiers. Thus, each DHCP binding represents an IP address-to-client identifier mapping for a wireless client to which the IP address is assigned.

Different versions of DHCP may be employed, such as DHCP IPv4 (referred to as "DHCPv4") and DHCP for IPv6 (referred to as "DHCPv6"). DHCPv4 configures IPv4 hosts (e.g., wireless clients) with IPv4 addresses, while DHCPv6 configures IPv6 hosts (e.g., wireless clients) with IPv6 addresses. DHCPv4 and DHCPv6 employ slightly different sets of DHCP messages. For example, DHCPv4 includes discover, offer, request, and acknowledge, where discover and request are generally referred to herein as "requests," and offer and acknowledge are generally referred to herein as "replies." On the other hand, DHCPv6 includes solicit, request, and acknowledge, where solicit and request are generally referred to herein as "requests," and acknowledge is generally referred to herein as a "reply."

RCM DHCP Embodiments

In the example of FIG. 1, wireless clients 114 perform RCM, i.e., rotate their MAC addresses, during communication sessions. For example, wireless client 114(1) may rotate its MAC address from addr1 to addr2 at the start of and/or during a communication session with wireless infrastructure 102. Embodiments presented herein include "RCM DHCP" embodiments in which wireless infrastructure 102 observes or snoops DHCP message exchanges between the wireless client and DHCP server 120 to detect and account for the MAC address rotation in order to (i) maintain a given IP lease (i.e., IP assignment) made by the DHCP server to the wireless client across the MAC address rotation, and (ii) maintain a consistent wireless client session context (referred to simply as a "session context") for the communication session in the wireless infrastructure across the MAC address rotation, which achieves session context persistence across the MAC address rotation. As is known, wireless infrastructure 102 uses session context(s) to manage communication sessions based on entries/mappings recorded in the session context(s) and based on many other parameters, such as session timeout parameters, for example. The RCM DHCP embodiments may be based on DHCPv4 or DHCPv6, for example.

When DHCP server 120 binds a lease of an IP address to a client identifier that is a MAC address, rotation of the MAC address can result in loss of the IP address, and disruption of a communication session. To mitigate this, the RCM DHCP embodiments based on DHCPv4 may move from using a MAC address to using option 61 of DHCPv4 as a stable identifier for the wireless client (as defined in RFC 2132) and to which an IP lease is bound in DHCP server 120. Similarly, wireless infrastructure 102 may bind a session context for the wireless client to the option 61 stable identifier instead of a MAC address to achieve session persistence across MAC address rotations. For example, wireless infrastructure 102 may use a MAC/IP binding to the option 61 stable identifier to map a random MAC address of a wireless client to a unique session in which the wireless client is engaged. As used herein, a "stable identifier" is a wireless client (device) identifier (also referred to simply as a "device identifier") that is stable or constant, i.e., does not change, across MAC address rotations performed by the wireless client.

With respect to DHCPv4, RFC 2132 states that the "option [61] is used by DHCP clients to specify their unique identifier. DHCP servers use this value to index their database of [DHCP] bindings. This value is expected to be unique for all clients in an administrative domain." Option 61 identifiers should be treated as opaque objects by DHCP servers. A stable identifier should be unique on a per DHCP scope (e.g., IP subnet), and any number of techniques may be used to generate the stable identifier. A wireless client may use its globally unique MAC address that is burned into local memory as the stable identifier. Alternatively, a wireless client can randomly generate the stable identifier (e.g., using techniques described in RFC 4122).

RCM DHCP embodiments based on DHCPv6 may use option 1 of DHCPv6 (as defined in RFC 3315) as a stable identifier for the wireless client instead of a MAC address and to which an IP lease is bound in DHCP server 120, and to which a session context for the wireless client is also bound in wireless infrastructure 102. In RFC 3315, option 1 is reserved as a client identifier option.

Figure 2:
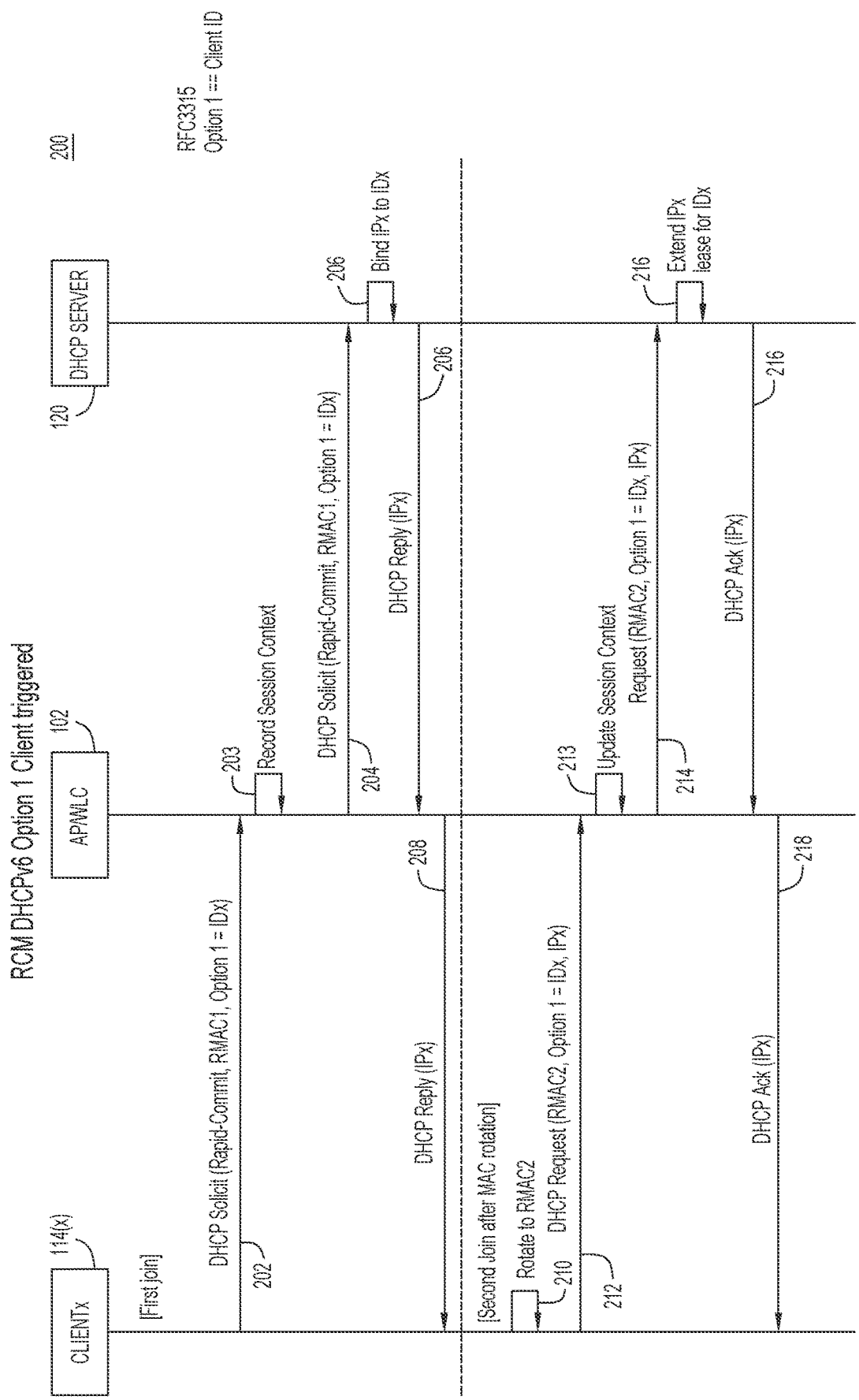
FIG. 2 is a transaction diagram of transactions performed in the network environment to implement an RCM dynamic host configuration protocol (DHCP) Internet Protocol (IP) version 6 (v6) (DHCPv6) option 1, client-triggered technique, according to an example embodiment.
Figure 3:
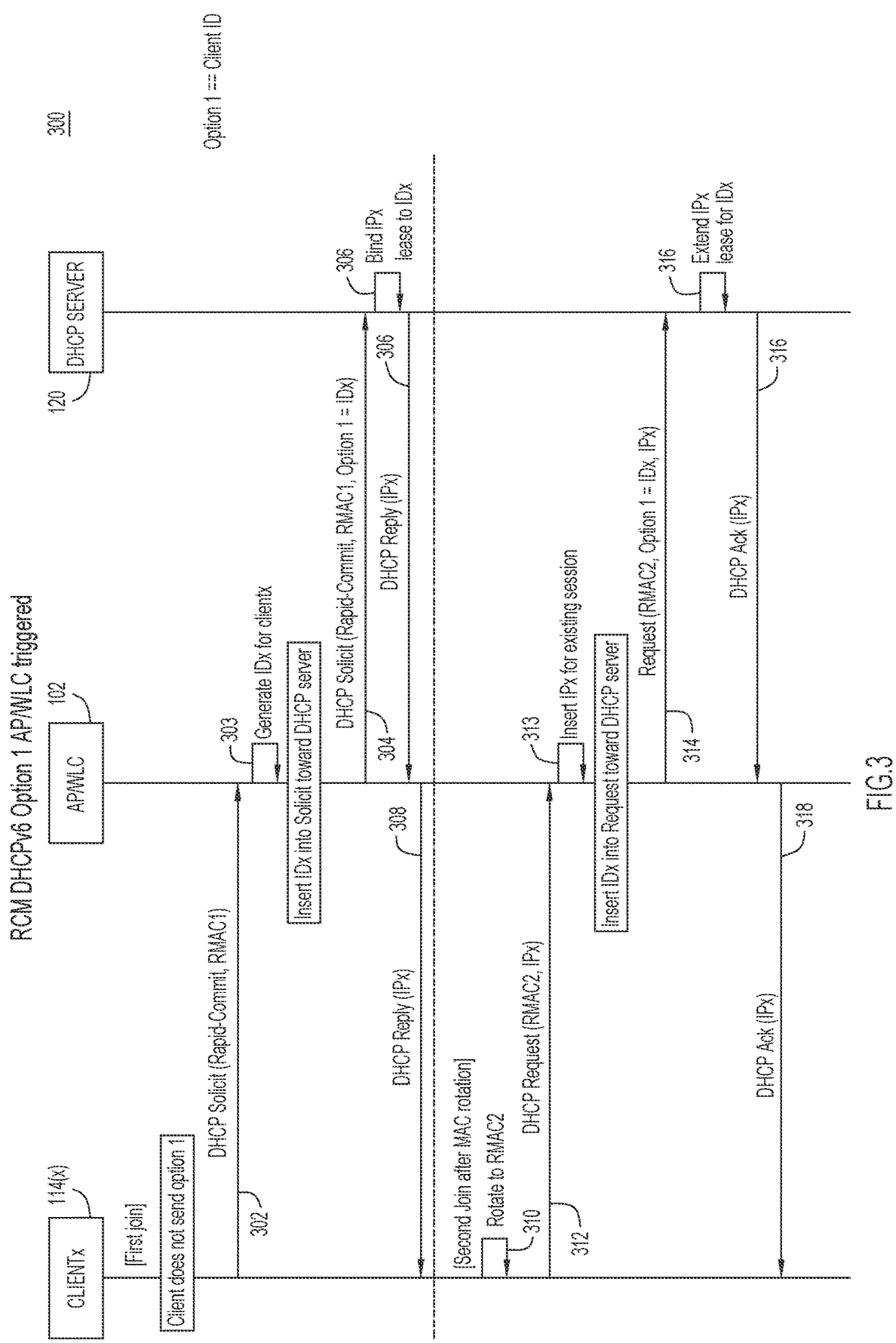
FIG. 3 is a transaction diagram of transactions performed in the network environment to implement an RCM DHCPv6 option 1, access point (AP)/wireless local area network (LAN) (WLAN) controller (WLC)-triggered technique, according to an example embodiment.
Figure 4:
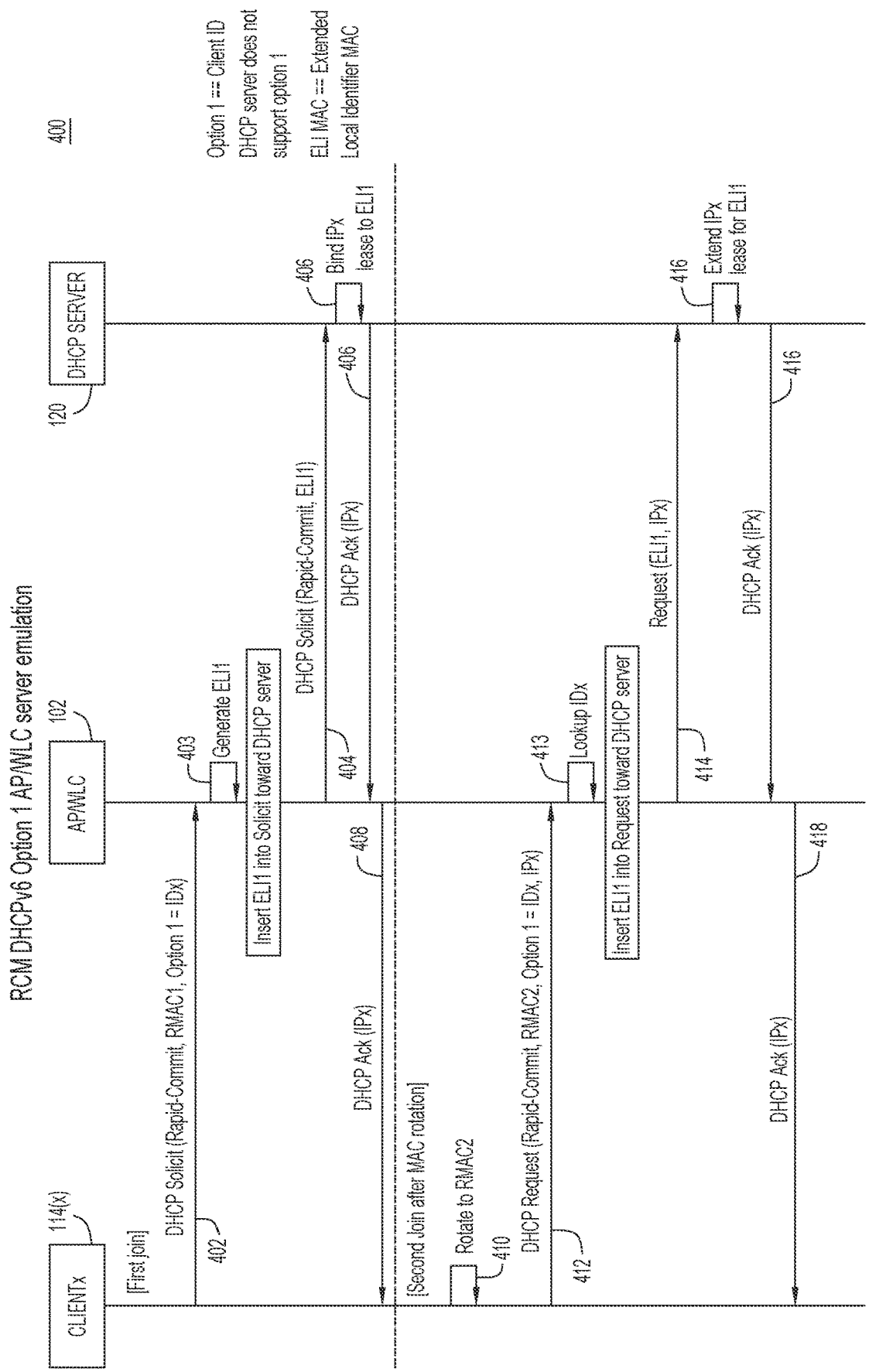
FIG. 4 is a transaction diagram of transactions performed in the network environment to implement an RCM DHCPv6 option 1, AP/WLC server emulation technique, according to an example embodiment.
Figure 5:
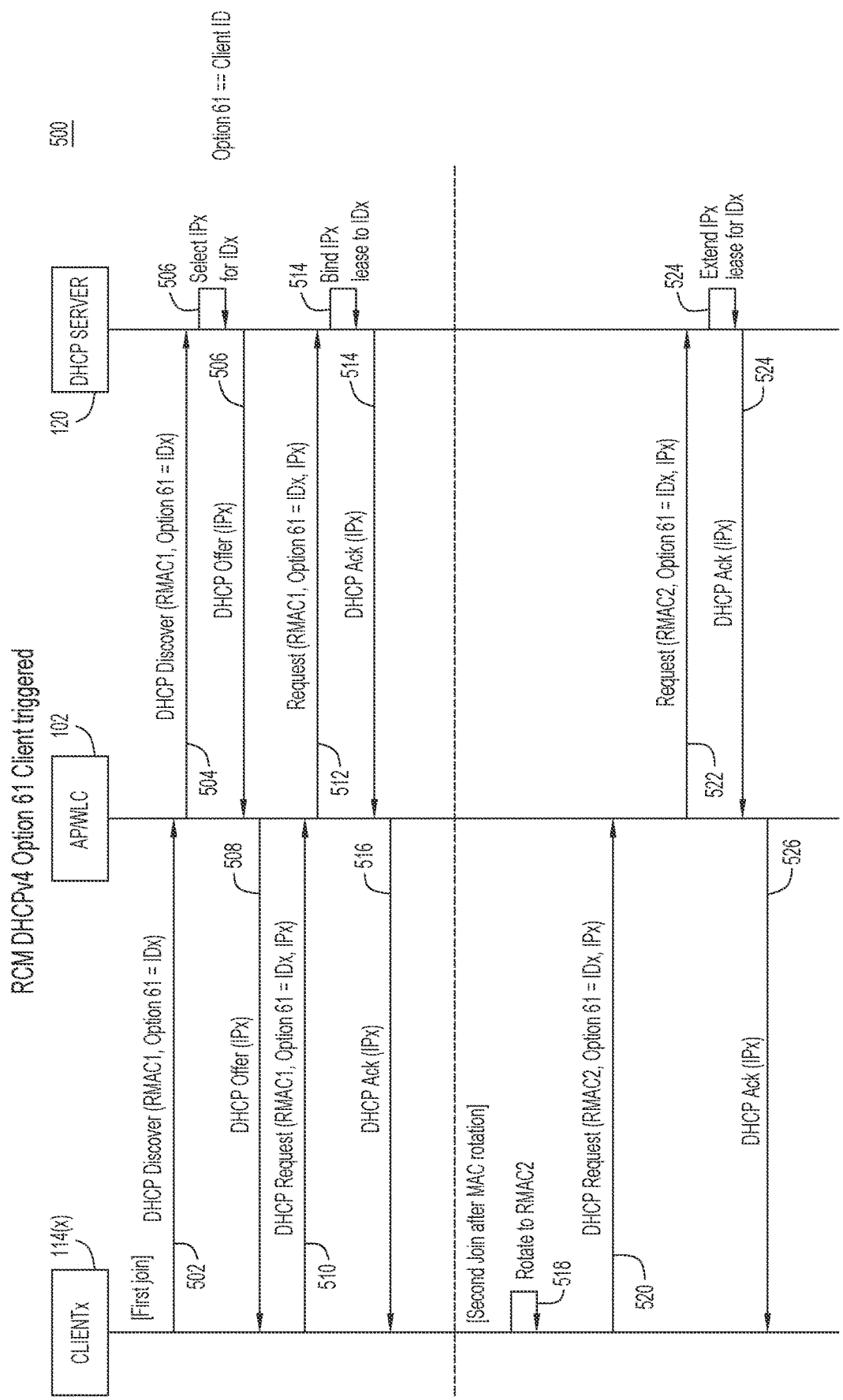
FIG. 5 is a transaction diagram of transactions performed in the network environment to implement an RCM DHCP version 4 (v4) (DHCPv4) option 61, client-triggered technique, according to an example embodiment.
Figure 6:
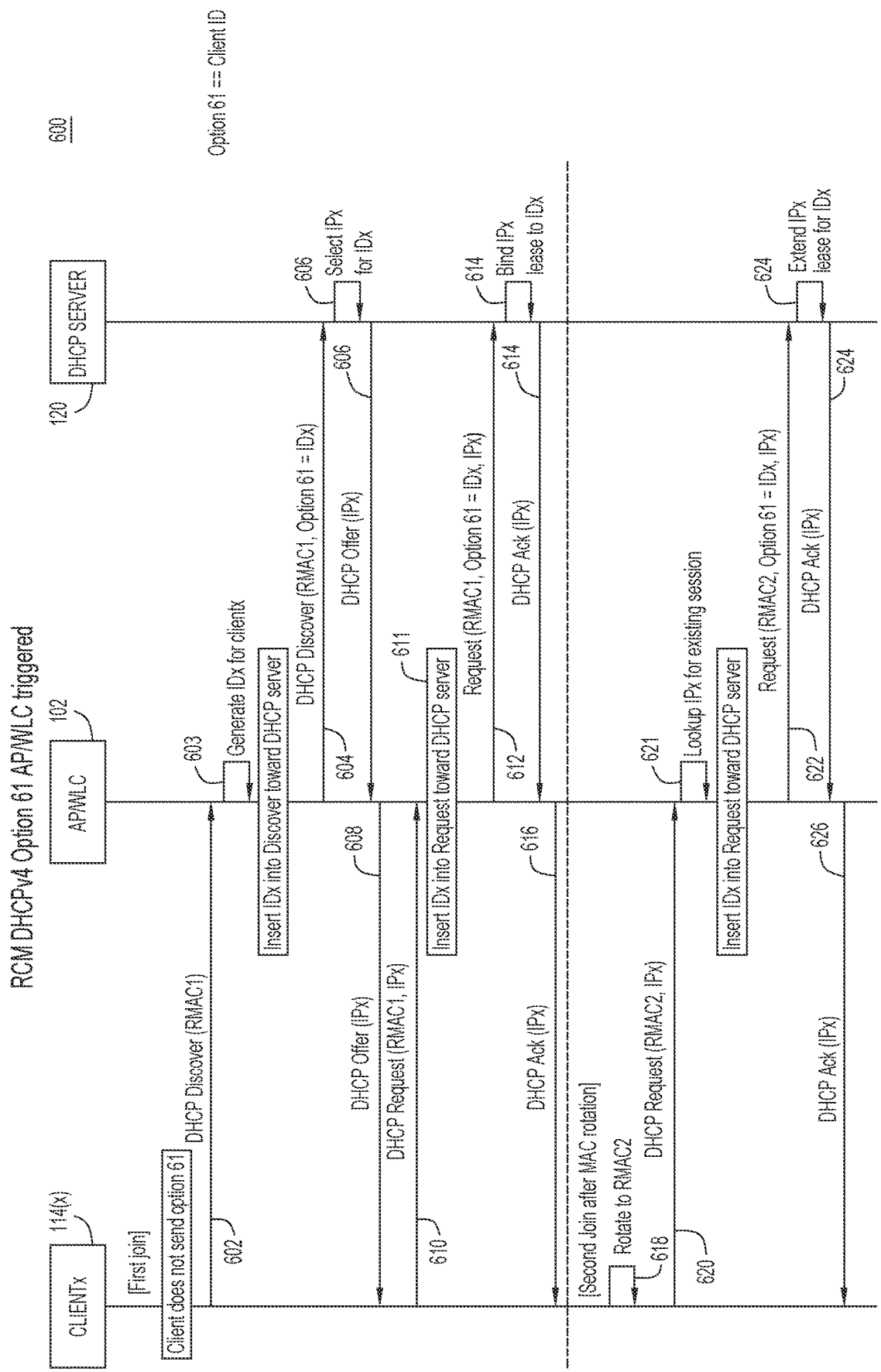
FIG. 6 is a transaction diagram of transactions performed in the network environment to implement an RCM DHPv4 option 61 AP/WLC-triggered technique, according to an example embodiment.
Figure 7:
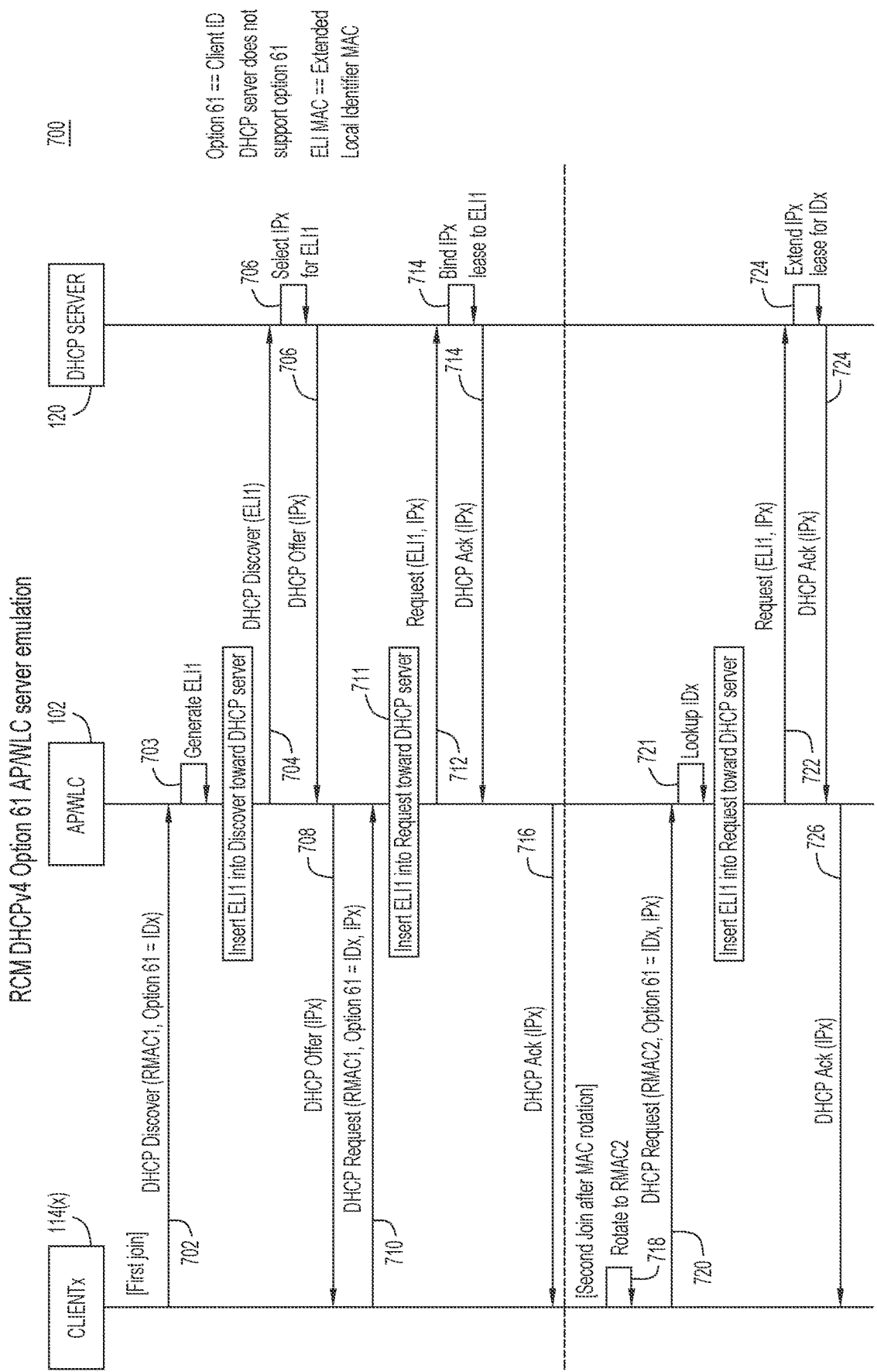
FIG. 7 is a transaction diagram of transactions performed in the network environment to implement an RCM DHCPv4 option 61, AP/WLC server emulation technique, according to an example embodiment.

The following six RCM DHCP embodiments, three based on DHCPv6 and three based on DHCPv4, will be described in connection with their corresponding figures:
  a. FIG. 2: RCM DHCPv6 option 1, client-triggered embodiment. The wireless client originates option 1
  b. FIG. 3: RCM DHCPv6 option 1, AP/WLC (i.e., wireless infrastructure)-triggered embodiment. The AP/WLC originates option 1.
  c. FIG. 4: RCM DHCPv6 option 1, AP/WLC server emulation embodiment. The wireless client originates option 1, and the AP/WLC originates a stable MAC address that masks rotated client MAC addresses.
  d. FIG. 5: RCM DHCPv4 option 61, client-triggered embodiment. The wireless client originates option 61.
  e. FIG. 6: RCM DHPv4 option 61, AP/WLC-triggered embodiment. The AP/WLC originates option 61.
  f. FIG. 7: RCM DHCPv4 option 61, AP/WLC server emulation embodiment. The wireless client originates option 61, and the AP/WLC originates a stable MAC address that masks rotated client MAC addresses.

With reference to FIG. 2, there is a transaction diagram of example transactions 200 performed in network environment 100 to implement the RCM DHCPv6 option 1, client-triggered embodiment. This embodiment assumes that a wireless client asserts its stable identifier (i.e., client identifier) in DHCP option 1, and DHCP server 120 recognizes DHCP option 1 and binds an assigned IP address to the DHCP option 1 identifier across client MAC address rotations.

When the wireless client (e.g., client 114(x) or "clientx" in FIG. 2) joins wireless infrastructure 102 a first time, at 202, the wireless client sends a solicit for an IP address to DHCP server 120 through the wireless infrastructure. The solicit includes a first MAC address RMAC1 currently used by the wireless client, and a stable identifier (ID) IDx in option 1 of the solicit (indicated as "option 1=IDx" in FIG. 2) to identify the wireless client. Upon receiving the solicit, at 203, wireless infrastructure 102 (denoted generally as "AP/WLC" in FIG. 2) "snoops" or examines stable identifier IDx in option 1, and searches a context database accessible to the wireless infrastructure for an existing/prior session context for the current session of the wireless client based on IDx. That is, wireless infrastructure 102 searches for an existing MAC address-to-option 61 (i.e., stable identifier=IDx) mapping for the wireless client. When the existing session context is not found because this is the first join, wireless infrastructure 102 records a new session context for the wireless client, e.g., records a session context-to-IDx mapping (i.e., maps the session context to IDx), and an RMAC1-to-IDx mapping in the new session context. At 204, wireless infrastructure 102 relays the solicit to DHCP server 120, without modification.

Upon receiving the solicit, at 206, DHCP server 120 searches existing (DHCP) bindings in database 122 for stable identifier IDx asserted in option 1. When an existing binding is not found because this is the first join, DHCP server 120 assigns/leases an IP address IPx to the wireless client for a lease time, and records in database 122 a new DHCP binding that maps IP address IPx to stable identifier IDx, not to MAC address RMAC1. DHCP server 120 generates a reply that includes IPx and sends the reply to the wireless client through wireless infrastructure 102. Upon receiving the reply, wireless infrastructure 102 may update the session context (which may be identified based on MAC address=RMAC1 in the reply) with IP address IPx from the reply and, at 208, relays the reply to the wireless client. The wireless client receives the reply and uses IPx for a communication session.

At 210, the wireless client rotates its MAC address from RMAC1 to RMAC2. After the rotation, when the wireless client joins wireless infrastructure 102 a second time, at 212, the wireless client sends a second request for an IP address to DHCP server 120 through the wireless infrastructure. The request includes rotated MAC address RMAC2 currently used by the wireless client, stable identifier IDx in option 1, and IP address IPx. Upon receiving the request, at 213, wireless infrastructure 102 snoops stable identifier IDx in option 1, and uses the stable identifier as an index to lookup and access the session context. Wireless infrastructure 102 merges/records IP address IPx (if not already present in the session context) and RMAC2 into the session context, e.g., creates a mapping between RMAC2, IPx, and IDx in the session context, which is used to maintain the current wireless session. At 214, wireless infrastructure 102 relays the request to DHCP server 120 without modification.

Upon receiving the request, at 216, DHCP server 120 searches database 122 for an existing DHCP binding for stable identifier IDx asserted in option 1. When the existing binding for stable identifier IDx is found (i.e., because it was recorded at 206 for the first join), DHCP server 120 extends the lease of IPx (e.g., reassigns IPx) to the wireless client and maintains the DHCP binding of IPx to IDx. DHCP server 120 may extend the lease time for IPx. DHCP server 120 generates an acknowledge ("Ack") that includes IPx, and sends the Ack to the wireless client through wireless infrastructure 102. At 218, wireless infrastructure 102 relays the Ack to the wireless client. The wireless client receives the Ack and continues to use IP address IPx for the communication session.

With reference to FIG. 3, there is a transaction diagram of example transactions 300 performed in network environment 100 to implement the RCM DHCPv6 option 1, AP/WLC-triggered embodiment. This embodiment assumes a wireless client does not use option 1, but DHCP server 120 recognizes option 1 and binds its assigned IP address to an identifier in option 1 for the wireless client across MAC address rotations by the wireless client.

When the wireless client joins wireless infrastructure 102 a first time, at 302, the wireless client sends a solicit to DHCP server 120 through the wireless infrastructure. The solicit includes a first MAC address RMAC1 for the wireless client, but does not include option 1. Upon receiving the solicit and recognizing that it does not include option 1, at 303, wireless infrastructure 102 (i) generates a stable identifier IDx for the wireless client (i.e., on behalf of the wireless client), (ii) records a session context that is mapped to IDx, and that maps RMAC1 to IDx, and (iii) modifies the solicit by inserting stable identifier IDx into option 1 of the solicit. At 304, wireless infrastructure 102 relays the modified solicit to DHCP server 120. Wireless infrastructure 102 may randomly generate the stable identifier, or select the stable identifier from a list of predetermined stable identifiers, for example.

Upon receiving the modified solicit, at 306, DHCP server 120 searches existing DHCP bindings in database 122 for stable identifier IDx asserted in option 1 of the solicit. When an existing DHCP binding for stable identifier IDx is not found because this is a first join by the wireless client, DHCP server 120 assigns/leases an IP address IPx to the wireless client for a lease time, and records a new DHCP binding that maps IP address IPx to stable identifier IDx indicated in option 1, not to MAC address RMAC1. DHCP server 120 generates a reply that includes IPx and sends the reply to the wireless client through wireless infrastructure 102. Upon receiving the reply, wireless infrastructure 102 merges IP address IPx from the reply into the existing session context (which may be identified based on MAC address=RMAC1 in the reply). Thus, the existing session context includes an IPx-to-IDx mapping. At 308, wireless infrastructure 102 relays the reply to the wireless client. The wireless client receives the reply and uses IPx for a communication session.

At 310, the wireless client rotates its MAC address from RMAC1 to RMAC2. After the rotation, when the wireless client joins wireless infrastructure 102 a second time, at 312, the wireless client sends a request to DHCP server 120 through the wireless infrastructure. The request includes rotated MAC address RMAC2 and IP address IPx, but no option 1. Upon receiving the request, at 313, wireless infrastructure 102 uses IP address IPx from the request to lookup stable identifier IDx in the existing session context, and updates the session context to include RMAC2. Wireless infrastructure 102 inserts stable identifier IDx into option 1 of the request and, at 314, relays the modified request to DHCP server 120.

Upon receiving the modified request, at 316, DHCP server 120 searches existing DHCP bindings for stable identifier IDx asserted in option 1. When the existing DHCP binding for stable identifier IDx is found (i.e., because it was recorded at 306 for the first join), DHCP server 120 extends the lease of IPx (e.g., reassigns IPx) to the wireless client and maintains the DHCP binding of IPx to IDx. DHCP server 120 may extend the lease time for IPx. DHCP server 120 generates an Ack that includes IPx and sends the Ack to the wireless client through wireless infrastructure 102. At 318, wireless infrastructure relays the Ack to the wireless client. The wireless client receives the Ack and continues to use IP address IPx for the communication session.

With reference to FIG. 4, there is a transaction diagram of example transactions 400 performed in network environment 100 to implement the RCM DHCPv6 option 1, AP/WLC server emulation embodiment. This embodiment assumes (i) a wireless client asserts its identifier in option 1, (ii) DHCP server 120 binds assigned IP addresses to client MAC addresses, not to option 1 identifiers, and (iii) wireless infrastructure 102 is aware that the DHCP server uses client MAC addresses, not option 1 identifiers, to bind the IP addresses.

When the wireless client joins wireless infrastructure 102 a first time, at 402, the wireless client sends a solicit to DHCP server 120 through the wireless infrastructure. The solicit includes a first MAC address RMAC1 and a stable identifier IDx in option 1 to identify the wireless client. Upon receiving the solicit, at 403, wireless infrastructure 102 (i) generates an extended local identifier (ELI) ELI1, which represents a non-rotating MAC address to be used as a stable identifier (i.e., a stable MAC address) for the wireless client, (ii) records a session context that is mapped to ELI1, and that maps RMAC1 to ELI1, and (iii) modifies the solicit by inserting stable identifier ELI1 into the field initially carrying RMAC1. In other words, wireless infrastructure 102 overwrites RMAC1 in the solicit with ELI1 to mask MAC address rotations. Wireless infrastructure 102 may randomly generate the ELI1, or select ELI1 from a list of predetermined stable identifiers, for example.

At 404, wireless infrastructure 102 relays the modified solicit to DHCP server 120.

Upon receiving the modified solicit with stable identifier ELI1 in place of RMAC1, at 406, DHCP server 120 searches existing DHCP bindings in database 122 for ELI1. When an existing DHCP binding is not found, DHCP server 120 assigns/leases an IP address IPx to the wireless client (ELI1) for a lease time, and records in database 122 a new DHCP binding that maps IP address IPx to ELI1. DHCP server 120 generates a reply (Ack) that includes IPx and sends the reply to the wireless client through wireless infrastructure 102.

Upon receiving the reply (Ack), wireless infrastructure 102 may update the session context (which may be identified based on MAC address=ELI1 in the reply) with IPx from the reply and, at 408, relays the reply to the wireless client. The wireless client receives the reply and uses IPx for a communication session.

At 410, the wireless client rotates its MAC address from RMAC1 to RMAC2. After the rotation, when the wireless client joins wireless infrastructure 102 a second time, at 412, the wireless client sends a request for an IP address to DHCP server 120 through the wireless infrastructure. The request includes rotated MAC address RMAC2, stable identifier IDx in option 1, and IP address IPx. Upon receiving the request, at 413, wireless infrastructure 102 uses stable identifier IDx from option 1 to lookup stable identifier ELI1 in the existing session context. Wireless infrastructure 102 merges/records IP address IPx (if not already present in the session context) and RMAC2 into the session context, e.g., creates a mapping between RMAC2, IPx, and ELI1 in the session context. Wireless infrastructure 102 overwrites RMAC2 in the request with ELI1 to mask the MAC address rotation and, at 414, relays the modified request to DHCP server 120.

Upon receiving the request, at 416, DHCP server 120 searches existing DHCP bindings for stable identifier ELI1. When the existing binding for stable identifier ELI1 is found, DHCP server 120 extends the lease of IPx (e.g., reassigns IPx) to the wireless client (ELI1) and maintains the DHCP binding of IPx to ELI1. DHCP server 120 may extend the lease time for IPx. DHCP server 120 generates an Ack that includes IPx and sends the Ack to the wireless client through wireless infrastructure 102. At 418, wireless infrastructure relays the Ack to the wireless client. The wireless client receives the Ack and continues to use IP address IPx for the communication session.

With reference to FIG. 5, there is a transaction diagram of example transactions 500 performed in network environment 100 to implement the RCM DHCPv4 option 61, client-triggered embodiment. This embodiment assumes that (i) a wireless client asserts its stable identifier in (DHCP) option 61, and (ii) DHCP server 120 recognizes option 61 as a stable identifier for the wireless client, and to which an IP address assigned to the wireless client is to be bound across MAC address rotations by the wireless client.

When the wireless client joins wireless infrastructure 102 a first time, at 502, the wireless client sends a discover to DHCP server 120 through the wireless infrastructure. The discover includes a first MAC address RMAC1 and stable identifier IDx in option 61. Upon receiving the discover, wireless infrastructure 102 records a session context that is mapped to IDx, and that includes an RMAC1-to-IDx mapping and, at 504, relays the discover to DHCP server 120 without modification.

Upon receiving the discover, at 506, DHCP server 120 selects IP address IPx for the wireless client (IDx), tentatively binds IPx to IDx, and sends an offer that includes IP address IPx to the wireless client through wireless infrastructure 102. Upon receiving the offer, at 508, wireless infrastructure 102 may update the existing session context to include IP address IPx from the offer, and relays the offer to the wireless client.

Upon receiving the offer, at 510, the wireless client sends a request including RMAC1, option 61 identifier IDx, and IPx to DHCP server 120 through wireless infrastructure 102. Upon receiving the request, at 512, wireless infrastructure may update the existing session context with an IPx-to-IDx mapping (if not already present from a previous update), and relays the request to DHCP server 120.

Upon receiving the request, at 514, DHCP server 120 assigns/leases IP address IPx to the wireless client for a lease time, records a new DHCP binding that maps IPx to IDx, and sends an Ack with IPx to the wireless client through wireless infrastructure 102. Upon receiving the Ack, at 516, wireless infrastructure 102 relays the Ack to the wireless client.

At 518, the wireless client rotates its MAC address from RMAC1 to RMAC2. After the rotation, when the wireless client joins wireless infrastructure 102 a second time, at 520, the wireless client sends a request to DHCP server 120 through the wireless infrastructure. The request includes rotated MAC address RMAC2, stable identifier IDx in option 61, and IP address IPx. Upon receiving the request, wireless infrastructure 102 snoops stable identifier IDx in option 61, and uses IDx to access the session context. Wireless infrastructure 102 merges/records IP address IPx (if not already present in the session context) and RMAC2 into the session context, e.g., creates a mapping between RMAC2, IPx, and IDx in the session context. At 522, wireless infrastructure 102 relays the request to DHCP server 120 without modification.

Upon receiving the request, at 524, DHCP server 120 extends the lease of IPx (e.g., reassigns IPx) to the wireless client (IDx) and maintains the DHCP binding of IPx to IDx. DHCP server 120 generates an Ack that includes IPx and sends the Ack to the wireless client through wireless infrastructure 102. At 526, wireless infrastructure 102 relays the Ack to the wireless client. The wireless client receives the Ack and continues to use IP address IPx for the communication session.

With reference to FIG. 6, there is a transaction diagram of example transactions 600 performed in network environment 100 to implement the RCM DHPv4 option 61, AP/WLC-triggered embodiment. This embodiment assumes that (i) a wireless client asserts its identifier as a MAC address, not in option 61, but (ii) DHCP server 120 recognizes option 61 as a stable identifier for the wireless client and to which an IP address assigned to the wireless client is to be bound across MAC address rotations by the wireless client.

When the wireless client joins wireless infrastructure 102 a first time, at 602, the wireless client sends a discover to DHCP server 120 through the wireless infrastructure. The discover includes a first MAC address RMAC1, but does not include option 61. Upon receiving the discover, at 603, wireless infrastructure 102 (i) generates/creates a stable identifier IDx (i.e., an option 61 identifier) for the wireless client, (ii) records a session context that is mapped to the option 61 identifier, and that includes an RMAC1-to-IDx mapping, and (iii) inserts IDx into option 61 of the discover. At 604, wireless infrastructure 102 relays the modified discover with option 61 to DHCP server 120.

Upon receiving the modified discover, at 606, DHCP server 120 selects IP address IPx for the wireless client (IDx), tentatively binds IPx to IDx, and sends an offer of IPx to the wireless client through wireless infrastructure 102. Upon receiving the offer, at 608, wireless infrastructure 102 may record IPx from the offer into the existing session context, and relays the offer to the wireless client.

Upon receiving the offer, at 610, the wireless client sends a request including RMAC1 and IPx (but no option 61) to DHCP server 120 through wireless infrastructure 102. Upon receiving the request, at 611, wireless infrastructure 102 uses IPx and/or RMAC1 from the request to find stable identifier IDx in the existing session context, and inserts IDx into option 61 of the request. At 612, wireless infrastructure 102 relays the modified request to DHCP server 120.

Upon receiving the request, at 614, DHCP server 120 assigns/leases IP address IPx to the wireless client (IDx) for a lease time, and records a new DHCP binding that maps IPx to IDx, and sends an Ack with IPx to the wireless client through wireless infrastructure 102. Upon receiving the Ack, at 616, wireless infrastructure 102 relays the Ack to the wireless client.

At 618, the wireless client rotates its MAC address from RMAC1 to RMAC2. After the rotation, when the wireless client joins wireless infrastructure 102 a second time, at 620, the wireless client sends a request for an IP address to DHCP server 120 through the wireless infrastructure. The request includes rotated MAC address RMAC2 and IP address IPx, but no option 61. Upon receiving the request, at 621, wireless infrastructure 102 uses IP address IPx from the request to lookup of stable identifier IDx in the existing session context, and merges RMAC2 into the existing session context with IDx and IPx. Wireless infrastructure 102 inserts IDx into option 61 of the request and, at 622, relays the modified request to DHCP server 120.

Upon receiving the modified request, at 624, DHCP server 120 extends the lease of IPx (e.g., reassigns IPx) to the wireless client (IDx) and maintains the DHCP binding of IPx to IDx. DHCP server 120 generates an Ack that includes IPx and sends the Ack to the wireless client through wireless infrastructure 102. At 626, wireless infrastructure 102 relays the Ack to the wireless client. The wireless client receives the Ack and continues to use IP address IPx for the communication session.

With reference to FIG. 7, there is a transaction diagram of example transactions 700 performed in network environment 100 to implement the RCM DHCPv4 option 61, AP/WLC server emulation embodiment. This embodiment assumes that (i) a wireless client asserts its identifier in option 61, (ii) DHCP server 120 binds an assigned IP address to a client MAC address, not to the option 61 identifier, and (iii) wireless infrastructure 102 is aware that the DHCP server uses the client MAC address, not the option 61 identifier, to bind to the IP address.

When the wireless client joins wireless infrastructure 102 a first time, at 702, the wireless client sends a discover to DHCP server 120 through the wireless infrastructure. The discover includes a first MAC address RMAC1 currently used by the wireless client, and a stable identifier IDx in option 61. Upon receiving the discover, at 703, wireless infrastructure 102 (i) generates an extended local identifier (ELI) ELI1 as a stable identifier (i.e., a stable MAC address) for the wireless client, (ii) records a session context that is mapped to ELI1 and the option 61 identifier, and that maps RMAC1 to ELI1, and (iii) and overwrites RMAC1 in the discover with ELI1 to mask the actual MAC address of the wireless client. At 704, wireless infrastructure 102 relays the modified discover to DHCP server 120.

Upon receiving the modified discover, at 706, DHCP server 120 selects IP address IPx for ELI1 asserted in the discover, tentatively binds IPx to ELI1, and sends an offer of IPx to the wireless client through wireless infrastructure 102. Upon receiving the offer, wireless infrastructure 102 may update the existing session context (which may be identified based on MAC address=ELI1 in the offer) with IPx from the offer and, at 708, relays the offer to the wireless client.

Upon receiving the offer, at 710, the wireless client sends a request including RMAC1, option 61 identifier IDx, and IPx to DHCP server 120 through wireless infrastructure 102. Upon receiving the request, at 711, wireless infrastructure 102 uses IDx from option 61 to lookup stable identifier ELI1 in the existing session context, may add IPx to the session context if it is not already included, and overwrites RMAC1 in the request with ELI1. At 712, wireless infrastructure 102 relays the modified request to DHCP server 120.

Upon receiving the modified request with ELI1, at 714, DHCP server 120 assigns IPx to the wireless client (ELI1), binds IPx to ELI1, and sends an Ack including IPx to the wireless client through wireless infrastructure 102. At 716, wireless infrastructure 102 relays the Ack to the wireless client.

At 718, the wireless client rotates its MAC address from RMAC1 to RMAC2. After the rotation, when the wireless client joins wireless infrastructure 102 a second time, at 720, the wireless client sends to DHCP server 120, through the wireless infrastructure, a request that includes rotated MAC address RMAC2, stable identifier IDx in option 61, and IP address IPx.

Upon receiving the request, at 721, wireless infrastructure 102 uses IDx from option 61 to lookup stable identifier ELI1 in the existing session context. Wireless infrastructure 102 merges/records IP address IPx (if not already present in the session context) and RMAC2 into the session context, e.g., creates a mapping between RMAC2, IPx, and ELI1. Wireless infrastructure 102 overwrites RMAC2 in the request with ELI1 to mask the MAC address rotation and, at 722, relays the modified request to DHCP server 120.

Upon receiving the modified request, at 724, DHCP server 120 extends the lease of IPx (e.g., reassigns IPx) to the wireless client (ELI1) and maintains the DHCP binding of IPx to ELI1. DHCP server 120 may extend the lease time for IPx. DHCP server 120 generates an Ack that includes IPx and sends the Ack to the wireless client through wireless infrastructure 102. At 726, wireless infrastructure 102 relays the Ack to the wireless client. The wireless client receives the Ack and continues to use IP address IPx for the communication session.

In summary, the RCM DHCP embodiments described above include various features to handle client MAC rotation. For example, a wireless infrastructure snoops a DHCP exchange between a wireless client and a DHCP server. The snooping obtains data that allows a determination of whether the wireless client obtained a globally routable IP address. The snooping may also provide data for re-writing domain name system (DNS) options. The snooping enables the wireless infrastructure to track use of option 61 (or option 1) in DHCP messages. The wireless infrastructure may employ the following procedure to track a wireless communication session across a MAC address rotation:

a. Snoop DHCP exchange for option 61 (or option 1).
b. If no prior option 61 (or prior option 1)-to-MAC address mapping exists, record a new mapping.
c. If a prior option 61 (or prior option 1) mapping exists, merge the current session context with the existing session context.

In an embodiment, the wireless client generates a stable identifier and sends it to a DHCP server as part of a discover. The wireless infrastructure snoops the discover and maps the stable identifier to the current client MAC address. Next, the wireless client rotates its MAC address from a first MAC address to a second MAC address, and sends a discover or a request with the stable identifier in option 61 (or option 1). The wireless infrastructure snoops the exchange, identifies that the wireless client is the same based on the stable identifier, and assigns the session context of the first MAC address to the second MAC address.

In another embodiment, the wireless client forewarns the wireless infrastructure about the MAC address rotation, but does not express its identity in the option 61 (or option 1). Alternatively, the wireless client expresses its identity in the option 61 (or option 1), which is then used by the wireless infrastructure as a confirmation of the client identity. In another embodiment in which the wireless client does not express option 61 (or option 1), the wireless infrastructure maintains information about the stable identifier (e.g., as received from the wireless client prior to its MAC address rotation), and inserts the stable identifier into a DHCP message with option 61 (or option 1), which informs the DHCP server of the client identity. In yet another embodiment, the DHCP server uses the stable identifier to recognize a wireless client as equivalent to a previously seen wireless client using a prior IP address, and assigns the prior IP address associated with a first MAC address and a second MAC address. In an even further embodiment, the DHCP server is unable to assign an IP address already assigned to a first MAC address asserted by a wireless client that is rotated to a second MAC address asserted by the wireless client. In some embodiments, the wireless infrastructure is aware of the aforementioned limitation (either by an administrative configuration, or by observation of a first wireless client failure). In that case, the wireless infrastructure, recognizing a wireless client as a previously seen wireless client despite a new MAC address, either inserts option 61 (or option 1) (or not), but also reuses a previous client MAC address, thus allowing the DHCP server to reassign the same IP address. Thus, session persistence is achieved as the wireless client rotates its MAC address.

Figure 8:
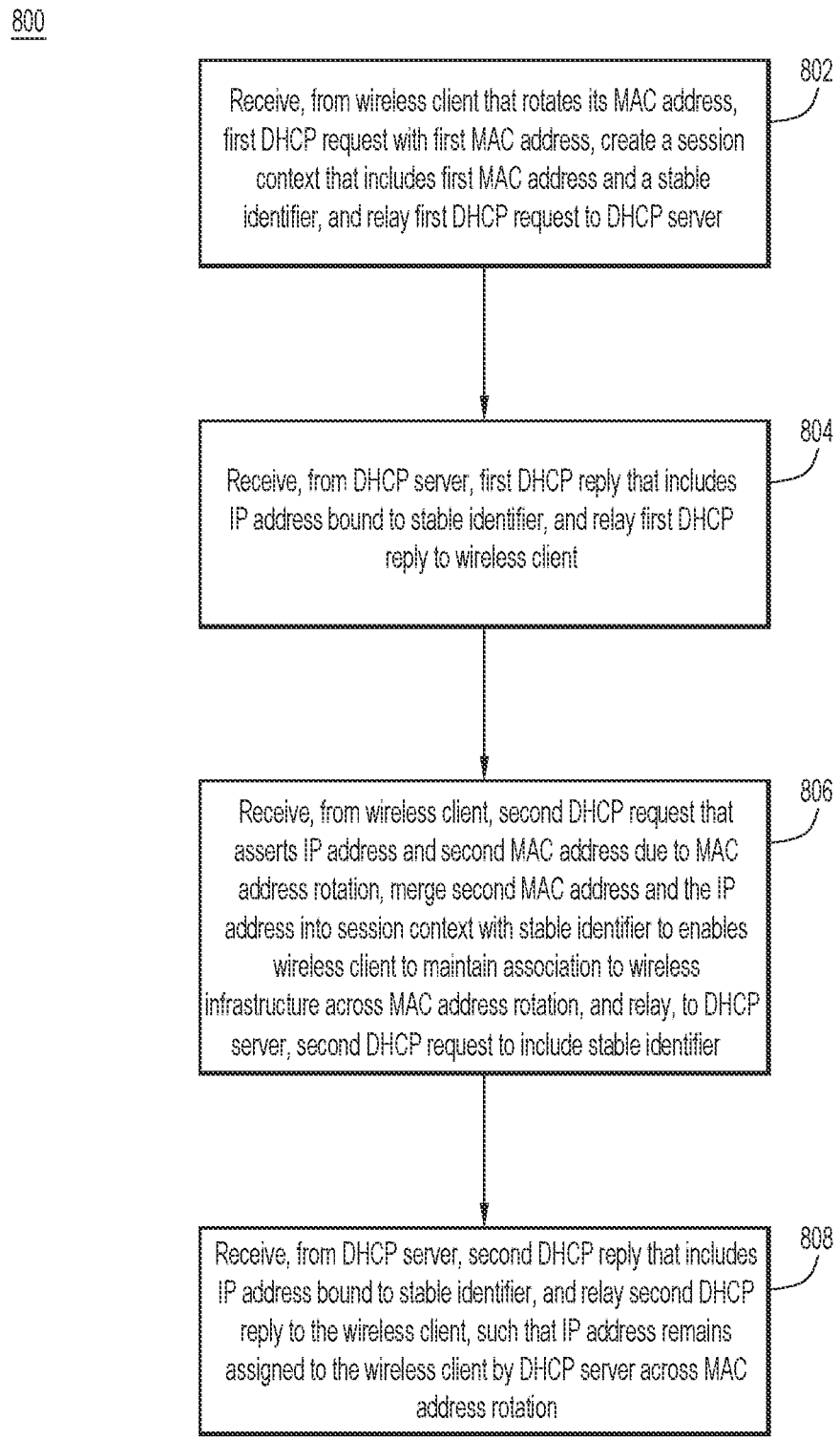
FIG. 8 is a flowchart of a high-level method of performing an RCM DHCP technique based on transactions described in connection with FIGS. 2-7, according to an example embodiment.

With reference to FIG. 8, there is a flowchart of a high-level method 800 of performing an RCM DHCP technique to persist a session context of a wireless client during MAC rotations, based on transactions described in connection with FIGS. 2-7. Method 800 may be performed by a wireless infrastructure (e.g., 102) configured to communicate with a DHCP server (e.g., 120) and a wireless client (e.g., 114(1)) that rotates its MAC addresses during a wireless client session. The wireless infrastructure is configured to relay DHCP messages between the wireless client and the DHCP server and to observe/snoop (e.g., parse, examine, access, and so on) the messages as they transit the wireless infrastructure. The DHCP messages may be based on DHCPv4 or DHCPv6, for example.

At 802, upon receiving, from the wireless client, a first DHCP request that includes a first MAC address, the wireless infrastructure creates, for the wireless client, a session context that includes, and is mapped to, the first MAC address and a stable identifier (e.g., option 1, option 61, or stable MAC address) for the wireless client that is stable across MAC address rotations, and relays the first DHCP request to the DHCP server. Upon receiving the first DHCP request relayed by the wireless infrastructure, the DHCP server assigns an IP address to the wireless client, records a DHCP binding (which may be tentative) that maps the stable identifier to the IP address, and sends a first DHCP reply to the wireless infrastructure.

At 804, the wireless infrastructure relays, from the DHCP server to the wireless client, a first DHCP reply that includes the IP address bound to the stable identifier.

At 806, upon receiving, from the wireless client, a second DHCP request that asserts the IP address and a second MAC address due to a MAC address rotation at the wireless client, the wireless infrastructure merges the second MAC address and the IP address into the session context with the stable identifier, and relays, to the DHCP server, the second DHCP request to include the stable identifier. Merging the session context enables the wireless client to maintain an association to the wireless infrastructure across the MAC address rotation because both MAC addresses are associated with the wireless client.

Upon receiving the second DHCP request relayed by the wireless infrastructure, the DHCP server reassigns the IP address to the wireless client (or simply extends a current lease of the IP address for the wireless client) based on the stable identifier asserted in the second DHCP request, maintains the (existing) DHCP binding that maps the stable identifier to the IP address, and sends a second DHCP reply with the IP address to the wireless client via the wireless infrastructure.

At 808, the wireless infrastructure relays, from the DHCP server to the wireless client, the second DHCP reply that includes the IP address bound to the stable identifier, such that the IP address remains assigned to the wireless client and bound to the stable identifier by the DHCP server across the MAC address rotation.

In the embodiments of FIGS. 2 and 5:
  a. Receiving the first DHCP request (at 802) includes receiving the first DHCP request to include the stable identifier in a device identifier option of the first DHCP request. Relaying the first DHCP request (at 802) includes relaying the first DHCP request with the device identifier option.
  b. Receiving the second DHCP request (at 806) includes receiving the second DHCP request to include the stable identifier in the device identifier option of the second DHCP request. Relaying the second DHCP request (at 806) includes relaying the second DHCP request with the device identifier option.

In addition to operations 802-808, the embodiments of FIGS. 3, 4, 6, and 7 further include:
  a. Upon receiving the first DHCP request, generating the stable identifier (e.g., a DHCPv6 option 1 device identifier, a DHCPv4 option 61 device identifier, or a stable/non-rotating MAC address to mask the rotating MAC address) and first inserting the stable identifier into the first DHCP request (e.g., by inserting option 1, inserting option 61, or overwriting a rotating MAC address with the stable MAC address) before relaying the first DHCP request.
  b. Upon receiving the first DHCP reply, recording the IP address in the session context.
  c. Upon receiving the second DHCP request, recognizing that the second DHCP request originates from the wireless client based on the IP address asserted in the second DHCP request and the IP address as recorded in the session context, and second inserting the stable identifier (e.g., the option 1, option 61, or MAC address stable identifier) into the second DHCP request before relaying the second DHCP request with the inserted stable identifier.

When the DHCP server is configured to implement DHCPv6, the first DHCP request, the first DHCP reply, the second DHCP request, and the second DHCP reply are a DHCPv6 solicit, a DHCPv6 reply, a DHCPv6 request, and a DHCPv6 acknowledge, respectively.

Alternatively, when the DHCP server is configured to implement DHCPv4:
  a. When the first DHCP request is a DHCPv4 discover or a DHCPv4 request, the first DHCP reply is a DHCPv4 offer or a DHCPv4 acknowledge, respectively.
  b. The second DHCP request and the second DHCP reply are respectively a DHCPv4 request and a DHCPv4 acknowledge.

Stateless Address Autoconfiguration (SLAAC) Embodiment

A SLAAC embodiment presented herein is directed to SLAAC for allocation of an IPv6 address to a wireless client in a way that maintains session context persistence and a persistent IPv6 address across MAC address rotations by the wireless client. Conventional IPv6 address allocation to a wireless client using an extended unique identifier (EUI)-64 mapping scheme based on a client MAC address leads to the undesired side effect of losing an IPv6 address upon a MAC address rotation. That is, when the MAC address rotates, the IPv6 address changes, and continuity of the client session/connection with wireless infrastructure 102 is lost.

To avoid the above side effect, the SLAAC embodiment moves away from using the EUI-64 address, to using an IPv6 address that is based in part on a randomly generated IPv6 suffix, and which maintains the IPv6 address across a MAC address rotation. In the SLAAC embodiment, wireless infrastructure 102 observes messages transiting the wireless infrastructure to and from the wireless client, and updates a session context across the MAC address rotation, as described below in connection with FIGS. 9 and 10.

Figure 9:
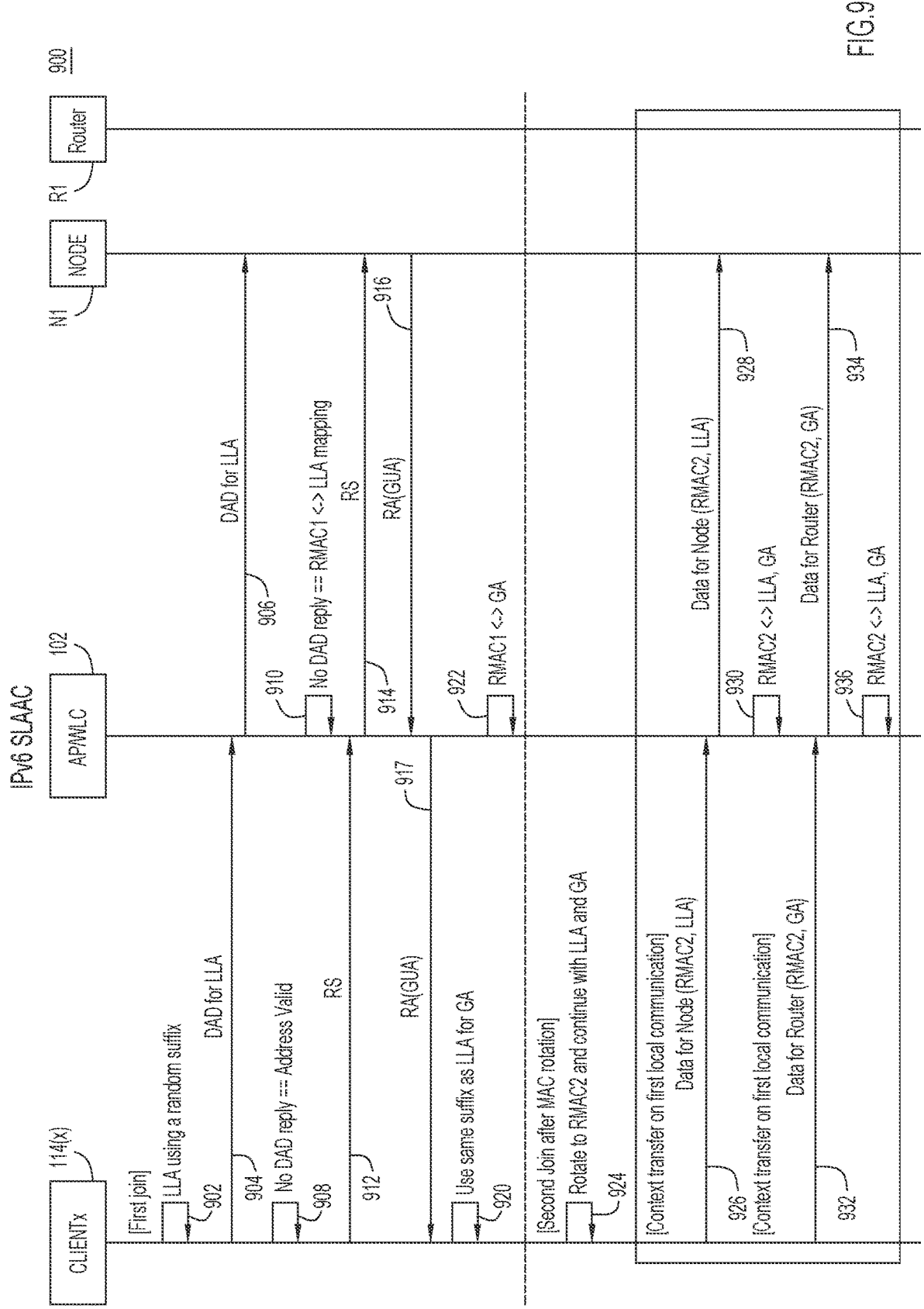
FIG. 9 is a transaction diagram of transactions for stateless address autoconfiguration (SLAAC) for IPv6 address assignment during MAC rotation, according to an example embodiment.

With reference to FIG. 9, there is a transaction diagram of example transactions 900 performed in network environment 100 for the SLAAC embodiment.

When a wireless client (e.g., wireless client 114(1)) joins wireless infrastructure 102 a first time, at 902, the wireless client generates a random link local address (LLA) (e.g., LLAx) that includes/uses a random IPv6 suffix. The LLA is not based on, or a function of, a MAC address of the wireless client, and is therefore stable across MAC address rotations. The wireless client performs duplicate address detection (DAD) for the LLA (referred to as "DAD for LLA") to confirm the LLA is unique on the IP subnet (e.g., WLAN 108) over which the wireless client communicates. To do this, at 904, the wireless client sends a neighbor solicitation request (also referred to as a "request packet") to neighbor nodes or hosts on the IP subnet through wireless infrastructure 102, and waits for a reply. The LLA is confirmed as unique and thus available for use by the wireless client when no neighbor nodes respond within a predetermined time period. In FIG. 9, each neighbor node is represented as a node N1. The neighbor solicitation request includes the LLA (e.g., LLAx) and MAC address RMAC1 currently used by the wireless client.

Upon receiving the neighbor solicitation request, at 906, wireless infrastructure 102 relays the neighbor solicitation request to the neighbor nodes (e.g., node N1) and waits for a reply. When no reply is received at the wireless client after the predetermined time period indicating the LLA is unique, at 908, the wireless client declares the LLA valid and available for use. Similarly, when no reply is received at wireless infrastructure 102, at 910, the wireless infrastructure records a session context for the wireless client that is mapped to the LLA (e.g., LLAx) and that includes an RMAC1-to-LLA (e.g., LLAx) mapping.

At 912, the wireless client sends, to router R1 through wireless infrastructure 102, a router solicitation (RS) for a global unicast allocation (GUA). The GUA includes a set of unique IPv6 prefixes for the IP subnet and that can be used by the wireless client to form global addresses (GAs), i.e., global IPv6 addresses. The RS carries RMAC1. Upon receiving the RS, at 914, wireless infrastructure 102 relays the RS to router R1. When router R1 receives the RS, the router generates a router advertisement (RA) that includes the GUA (i.e., the unique IPv6 prefixes) and, at 916, sends the RA to the wireless client through wireless infrastructure 102. Upon receiving the RA, at 917, wireless infrastructure 102 relays the RA to the wireless client. Upon receiving the RA, at 920, the wireless client computes a respective GA (i.e., a global IPv6 address) corresponding to each of the IPv6 prefixes in the GUA. To do this, the wireless client combines each of the IPv6 prefixes in the GUA with the LLA (e.g., LLAx) to form corresponding IPv6 global addresses. Each IPv6 global address includes an IPv6 prefix from the GUA combined with an IPv6 suffix based on (e.g., equal to) the LLA.

At 922, similar to the wireless client, wireless infrastructure 102 computes the global IPv6 addresses, and creates an RMAC1-to-IPv6 address mapping for each of the global IPv6 addresses (i.e., for each GA) and records the mappings in the session context.

At 924, after the wireless client rotates its MAC address from RMAC1 to RMAC2, the wireless client joins wireless infrastructure 102 a second time, while continuing to use the LLA (e.g., LLAx) and one of the GAs (e.g., GAx). At 926, the wireless client sends a first data packet (e.g., a normal traffic packet) to one or more hosts (e.g., node N1) on the IP subnet through wireless infrastructure 102. The first data packet includes RMAC2 and the LLA (e.g., LLAx), but not necessarily the GA (e.g., GAx). Upon receiving the first data packet, at 928, wireless infrastructure 102 relays the first data packet to the one or more hosts (e.g., node N1). Additionally, at 930, wireless infrastructure 102 records a mapping of RMAC2 to both the LLA and each of the GAs in the session context. It is understood that when a mapping between components is stored in the session context, the session context is said to be mapped to each of the components since each of the components may be used independently to find and access the session context and the mapping recorded in the session context.

At 932, the wireless client sends a second data packet to node N1 through wireless infrastructure 102. The second data packet includes RMAC2 and asserts one of the GAs (e.g., GAx). Upon receiving the data packet, at 934, wireless infrastructure 102 relays the second data packet to router R1. Additionally, at 936, wireless infrastructure 102 records/maintains the mapping of RMAC2 to both LLA (e.g., LLAx) and the GA (e.g., GAx) in the session context.

Figure 10:
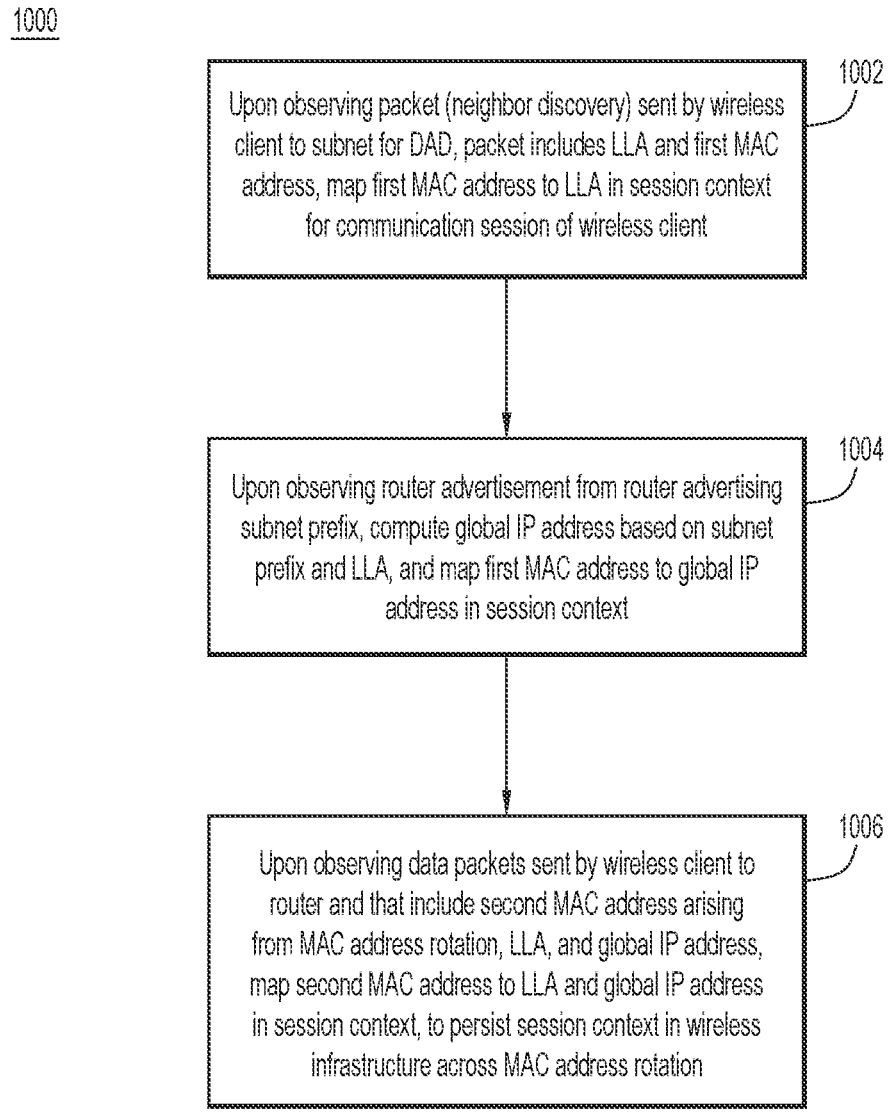
FIG. 10 is a flowchart of a method for SLAAC during MAC rotation, according to an example embodiment.

With reference to FIG. 10, there is a flowchart of an example method 1000 for the SLAAC embodiment. Operations of method 1000 are based on transactions described in connection with FIG. 9. Method 1000 is primarily performed at a wireless infrastructure (e.g., 102) configured to support SLAAC IP address assignment to a wireless client (e.g., 114(1)).

Upon observing/relaying a packet (e.g., a neighbor solicitation request) sent by the wireless client to an IP subnet (referred to more broadly as a "subnet") for DAD, the packet including an LLA and a first MAC address, at 1002, the wireless infrastructure records a session context for a wireless communication session for the wireless client, where the session context is mapped to the LLA and includes a mapping of the first MAC address to the LLA.

Upon observing and relaying a router advertisement, sent to the wireless client by a router configured to forward data packets between the subnet and a network, the router advertisement advertising a subnet prefix, at 1004, the wireless infrastructure computes a global IP address based on the subnet prefix and the LLA, and maps the first MAC address to the global IP address in the session context.

Upon observing and relaying data packets (e.g., a first data packet and a second data packet) sent by the wireless client to the router and that include a second MAC address arising from a MAC address rotation, the LLA, and the global IP address, at 1006, the wireless infrastructure records a mapping of (i.e., maps) (e.g., by a first mapping operation and a second mapping operation based on the first data packet and the second data packet) the second MAC address to the LLA and the global IP address in the session context, to persist the session context across the MAC address rotation.

With reference to FIG. 11A there is an illustration of an example session context 1100 that may result in one or more of the RCM DHCP embodiments. MAC address rotation from RMAC1 to RMAC2 results in (i) a first mapping 1102 between a stable identifier (e.g., IDx or ELI1), IP address IPx, and RMAC1, and (ii) a second mapping 1104 between the stable identifier, IPx, and RMAC2.

With reference to FIG. 11B there is an illustration of an example session context 1120 that may result in the SLAAC embodiment. MAC address rotation from RMAC1 to RMAC2 results in (i) first mappings 1122 between RMAC1, an LLA (e.g., LLAx), and a GA (e.g., GAx), and (ii) a second mapping 1124 between RMAC2, LLAx, and GAx.

Figure 12:
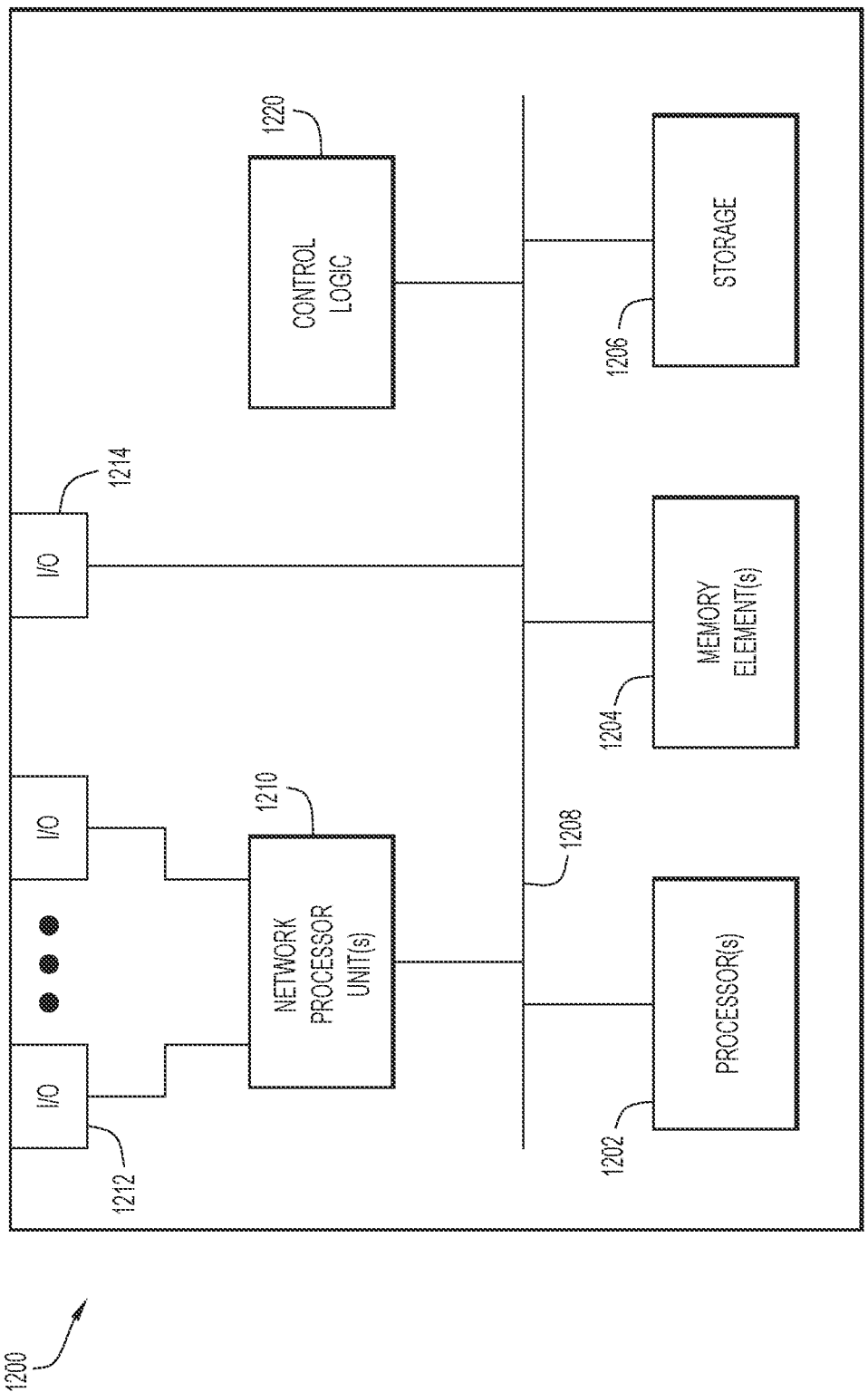
FIG. 12 is a hardware block diagram of a device that may perform functions associated with operations described herein, according to an example embodiment.

FIG. 12 is a hardware block diagram of a device 1200 that may perform functions associated with any of the operations discussed above, such as but not limited to any of the discussions of FIGS. 1-11B. In various embodiments, any of the devices described above (e.g., an AP, a WLC, and a DHCP server/service) implement, in some embodiments, a computing architecture that is analogous to or substantially the same as that described below with respect to the device 1200.

In at least one embodiment, the device 1200 may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for device 1200 can overlap in any manner and are not limited to the specific allocation of instructions and/or operations described herein.

In at least one embodiment, processor(s) 1202 is/are at least one hardware processor configured to execute various tasks, operations and/or functions for device 1200 as described herein according to software and/or instructions configured for device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with device 1200, and/or logic configured for memory element(s) 1204 and/or storage 1206. For example, any logic described herein (e.g., control logic 1220) can, in various embodiments, be stored for device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of device 1200 to communicate in order to exchange information and/or data. Bus 1208 can be implemented with any architecture designed for passing control, data and/or information between processors, memory elements/storage, peripheral devices, and/or any other hardware and/or software components that may be configured for device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between device 1200 and other systems, devices, or entities, via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1200 and other systems, devices, or entities to facilitate operations for various embodiments described herein. In various embodiments, network I/O interface(s) 1212 can be configured as one or more Ethernet port(s), Fibre Channel ports, any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other entities that may be connected to device 1200. For example, I/O interface(s) 1214 may provide a connection to external devices such as a keyboard, keypad, a touch screen, and/or any other suitable input and/or output device now known or hereafter developed. This may be the case, in particular, when the device 1200 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 1200 serves as a user device as described herein.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate and implement various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any LAN, virtual LAN (VLAN), WAN (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), IEEE 802.11 (e.g., Wi-Fi®/Wi-Fib®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm) wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IPv4 and/or IPv6 addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 9) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

The methods presented herein may be embodied in a non-transitory computer readable storage medium comprising instructions that when executed configure one or more processors to perform the operations of the method.

In summary, in some aspects, the techniques described herein relate to a method including: at a wireless infrastructure to communicate with a dynamic host configuration protocol (DHCP) server and a wireless client that rotates its media access control (MAC) address: upon receiving, from the wireless client, a first DHCP request that includes a first MAC address, creating, for the wireless client, a session context that includes the first MAC address and a stable identifier for the wireless client that is stable across MAC address rotations, and relaying the first DHCP request to the DHCP server; relaying, from the DHCP server to the wireless client, a first DHCP reply that includes an Internet Protocol (IP) address bound to the stable identifier; upon receiving, from the wireless client, a second DHCP request that asserts the IP address and a second MAC address due to a MAC address rotation, merging the second MAC address and the IP address into the session context with the stable identifier, and relaying, to the DHCP server, the second DHCP request to include the stable identifier; and relaying, from the DHCP server to the wireless client, a second DHCP reply that includes the IP address bound to the stable identifier.

In some aspects, the techniques described herein relate to a method, wherein: merging the second MAC address and the IP address into the session context with the stable identifier enables the wireless client to maintain an association to the wireless infrastructure across the MAC address rotation; and the IP address remains assigned to the wireless client and bound to the stable identifier by the DHCP server across the MAC address rotation.

In some aspects, the techniques described herein relate to a method, wherein: receiving the first DHCP request includes receiving the first DHCP request to include the stable identifier in a device identifier option of the first DHCP request, and relaying the first DHCP request includes relaying the first DHCP request with the device identifier option; and receiving the second DHCP request includes receiving the second DHCP request to include the stable identifier in the device identifier option of the second DHCP request, and relaying the second DHCP request includes relaying the second DHCP request with the device identifier option.

In some aspects, the techniques described herein relate to a method, further including: upon receiving the first DHCP request, generating the stable identifier and first inserting the stable identifier into the first DHCP request before relaying the first DHCP request; recording the IP address asserted in the first DHCP reply; and upon receiving the second DHCP request, recognizing that the second DHCP request originates from the wireless client based on the IP address asserted in the second DHCP request and the IP address as recorded, and second inserting the stable identifier into the second DHCP request before relaying the second DHCP request.

In some aspects, the techniques described herein relate to a method, wherein: first inserting includes inserting the stable identifier into a device identifier option of the first DHCP request; and second inserting includes inserting the stable identifier into the device identifier option of the second DHCP request.

In some aspects, the techniques described herein relate to a method, wherein the device identifier option is device identifier option 1 of DHCP IP version 6 (DHCPv6).

In some aspects, the techniques described herein relate to a method, wherein the device identifier option is device identifier option 61 of DHCP IP version 4 (DHCPv4).

In some aspects, the techniques described herein relate to a method, wherein: first inserting includes overwriting the first MAC address of the first DHCP request with the stable identifier to present the stable identifier to the DHCP server as a stable MAC address; and second inserting includes overwriting the second MAC address of the second DHCP request with the stable identifier to present the stable identifier to the DHCP server as the stable MAC address.

In some aspects, the techniques described herein relate to a method, wherein: the DHCP server is configured to implement DHCP for IP version 6 (DHCPv6); and the first DHCP request, the first DHCP reply, the second DHCP request, and the second DHCP reply are a DHCPv6 solicit, a DHCPv6 reply, a DHCPv6 request, and a DHCPv6 acknowledge, respectively.

In some aspects, the techniques described herein relate to a method, wherein: the DHCP server is configured to implement DHCP for IP version 4 (DHCPv4); when the first DHCP request is a DHCPv4 discover or a DHCPv4 request, the first DHCP reply is a DHCPv4 offer or a DHCPv4 acknowledge, respectively; and the second DHCP request and the second DHCP reply are respectively a DHCPv4 request and a DHCPv4 acknowledge.

In some aspects, the techniques described herein relate to a method, further including, at the DHCP server: upon receiving the first DHCP request relayed by the wireless infrastructure, assigning the IP address to the wireless client, recording a DHCP binding that maps the stable identifier to the IP address, and sending the first DHCP reply to the wireless infrastructure; and upon receiving the second DHCP request relayed by the wireless infrastructure, extending a lease of the IP address to the wireless client based on the stable identifier asserted in the second DHCP request, maintaining the DHCP binding that maps the stable identifier to the IP address, and sending, to the wireless client, the second DHCP reply to include the IP address.

In some aspects, the techniques described herein relate to an apparatus including: a network input/output interface to communicate with one or more networks; and a processor implemented in a wireless infrastructure configured to communicate with a dynamic host configuration protocol (DHCP) server and a wireless client that rotates its media access control (MAC) address, the processor coupled to the network input/output interface and configured to perform: upon receiving, from the wireless client, a first DHCP request that includes a first MAC address, creating, for the wireless client, a session context that includes the first MAC address and a stable identifier for the wireless client that is stable across MAC address rotations, and relaying the first DHCP request to the DHCP server; relaying, from the DHCP server to the wireless client, a first DHCP reply that includes an Internet Protocol (IP) address bound to the stable identifier; upon receiving, from the wireless client, a second DHCP request that asserts the IP address and a second MAC address due to a MAC address rotation, merging the second MAC address and the IP address into the session context with the stable identifier, and relaying, to the DHCP server, the second DHCP request to include the stable identifier; and relaying, from the DHCP server to the wireless client, a second DHCP reply that includes the IP address bound to the stable identifier.

In some aspects, the techniques described herein relate to an apparatus, wherein: the processor is configured to perform merging the second MAC address and the IP address into the session context with the stable identifier to enable the wireless client to maintain an association to the wireless infrastructure across the MAC address rotation; and the IP address remains assigned to the wireless client and bound to the stable identifier by the DHCP server across the MAC address rotation.

In some aspects, the techniques described herein relate to an apparatus, wherein: the processor is configured to perform receiving the first DHCP request by receiving the first DHCP request to include the stable identifier in a device identifier option of the first DHCP request, and relaying the first DHCP request includes relaying the first DHCP request with the device identifier option; and the processor is configured to perform receiving the second DHCP request by receiving the second DHCP request to include the stable identifier in the device identifier option of the second DHCP request, and relaying the second DHCP request includes relaying the second DHCP request with the device identifier option.

In some aspects, the techniques described herein relate to an apparatus, wherein the processor is further configured to perform: upon receiving the first DHCP request, generating the stable identifier and first inserting the stable identifier into the first DHCP request before relaying the first DHCP request; recording the IP address asserted in the first DHCP reply; and upon receiving the second DHCP request, recognizing that the second DHCP request originates from the wireless client based on the IP address asserted in the second DHCP request and the IP address as recorded, and second inserting the stable identifier into the second DHCP request before relaying the second DHCP request.

In some aspects, the techniques described herein relate to an apparatus, wherein the processor is configured to perform: first inserting by inserting the stable identifier into a device identifier option of the first DHCP request; and second inserting by inserting the stable identifier into the device identifier option of the second DHCP request.

In some aspects, the techniques described herein relate to an apparatus, wherein the device identifier option is device identifier option 1 of DHCP IP version 6 (DHCPv6).

In some aspects, the techniques described herein relate to an apparatus, wherein the device identifier option is device identifier option 61 of DHCP IP version 4 (DHCPv4).

In some aspects, the techniques described herein relate to an apparatus, wherein the processor is configured to perform: first inserting by overwriting the first MAC address of the first DHCP request with the stable identifier to present the stable identifier to the DHCP server as a stable MAC address; and second inserting by overwriting the second MAC address of the second DHCP request with the stable identifier to present the stable identifier to the DHCP server as the stable MAC address.

In some aspects, the techniques described herein relate to a non-transitory computer readable storage medium including instructions that when executed by a processor implemented in a wireless infrastructure configured to communicate with a dynamic host configuration protocol (DHCP) server and a wireless client that rotates its media access control (MAC) address, cause the processor to perform: upon receiving, from the wireless client, a first DHCP request that includes a first MAC address, creating, for the wireless client, a session context that includes the first MAC address and a stable identifier for the wireless client that is stable across MAC address rotations, and relaying the first DHCP request to the DHCP server; relaying, from the DHCP server to the wireless client, a first DHCP reply that includes an Internet Protocol (IP) address bound to the stable identifier; upon receiving, from the wireless client, a second DHCP request that asserts the IP address and a second MAC address due to a MAC address rotation, merging the second MAC address and the IP address into the session context with the stable identifier, and relaying, to the DHCP server, the second DHCP request to include the stable identifier; and relaying, from the DHCP server to the wireless client, a second DHCP reply that includes the IP address bound to the stable identifier.

In some aspects, the techniques described herein relate to a method including: at a wireless infrastructure configured to support stateless address autoconfiguration (SLAAC) Internet Protocol (IP) address assignment to a wireless client hosted on an subnet and configured to rotate its media access control (MAC) address: upon observing a packet sent by the wireless client to the subnet for duplicate address detection, the packet including a link local address and a first MAC address, recording a mapping of (i.e., mapping) the first MAC address to the link local address in a session context for the wireless client; upon observing a router advertisement from a router advertising a subnet prefix for the subnet, computing a global IP address based on the subnet prefix and the link local address, and recording a mapping of the first MAC address to the global IP address in the session context; and upon observing data packets sent by the wireless client to the router and that include a second MAC address due to a MAC address rotation, the link local address, and the global IP address, recording a mapping of the second MAC address to the link local address and the global IP address in the session context, to persist the session context across the MAC address rotation.

In some aspects, the techniques described herein relate to a method, wherein the link local address is randomly generated by the wireless client to be stable across the MAC address rotation.

In some aspects, the techniques described herein relate to a method, wherein observing the data packets includes: observing a first data packet that includes the second MAC address and the link local address, but not the global IP address; observing a second data packet that includes the second MAC address and the global IP address; and recording the mapping of the second MAC address includes recording the mapping of the second MAC address responsive to observing the first data packet and the second data packet.

In some aspects, the techniques described herein relate to a method, wherein recording the mapping further includes: recording a first mapping of the second MAC address to the link local address based on the first data packet; and recording a second mapping of the second MAC address to the global IP address based on the first data packet.

In some aspects, the techniques described herein relate to a method, wherein the SLAAC IP address assignment is for an IP version (v) 6 (IPv6) address.

In some aspects, the techniques described herein relate to a method, wherein: the subnet prefix includes an IP version (v) 6 (IPv6) prefix and the link local address includes an IPv6 suffix; and computing includes combining the IPv6 prefix with the IPv6 suffix to form the global IP address as an IPv6 address.

In some aspects, the techniques described herein relate to a method, further including: prior to observing the router advertisement, relaying, from the wireless client to the router, a router solicitation for the subnet prefix.

In some aspects, the techniques described herein relate to a method, wherein the router advertisement is sent by to the wireless client by a router configured to forward data packets between the subnet and a network.

In some aspects, the techniques described herein relate to an apparatus including: a network input/output interface to communicate with one or more networks; and a processor implemented in a wireless infrastructure configured to support stateless address autoconfiguration (SLAAC) Internet Protocol (IP) address assignment to a wireless client hosted on an subnet and configured to rotate its media access control (MAC) address, the processor coupled to the network input/output interface and configured to perform: upon observing a packet sent by the wireless client to the subnet for duplicate address detection, the packet including a link local address and a first MAC address, recording a mapping of the first MAC address to the link local address in a session context for the wireless client; upon observing a router advertisement from a router advertising a subnet prefix for the subnet, computing a global IP address based on the subnet prefix and the link local address, and recording a mapping of the first MAC address to the global IP address in the session context; and upon observing data packets sent by the wireless client to the router and that include a second MAC address due to a MAC address rotation, the link local address, and the global IP address, recording a mapping of the second MAC address to the link local address and the global IP address in the session context, to persist the session context across the MAC address rotation.

In some aspects, the techniques described herein relate to a non-transitory computer readable medium encoded with instructions that, when executed by a processor implemented in a wireless infrastructure configured to support stateless address autoconfiguration (SLAAC) Internet Protocol (IP) address assignment to a wireless client hosted on an subnet and configured to rotate its media access control (MAC) address, cause the processor to perform: upon observing a packet sent by the wireless client to the subnet for duplicate address detection, the packet including a link local address and a first MAC address, recording a mapping of the first MAC address to the link local address in a session context for the wireless client; upon observing a router advertisement from a router advertising a subnet prefix for the subnet, computing a global IP address based on the subnet prefix and the link local address, and recording a mapping of the first MAC address to the global IP address in the session context; and upon observing data packets sent by the wireless client to the router and that include a second MAC address due to a MAC address rotation, the link local address, and the global IP address, recording a mapping of the second MAC address to the link local address and the global IP address in the session context, to persist the session context across the MAC address rotation.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

at a wireless infrastructure to communicate with a dynamic host configuration protocol (DHCP) server and a wireless client that rotates its media access control (MAC) address:

upon receiving, from the wireless client, a first DHCP request that includes a first MAC address, creating, for the wireless client, a session context in the wireless infrastructure that includes the first MAC address and a stable identifier for the wireless client that is stable across MAC address rotations, and relaying the first DHCP request to the DHCP server;

relaying, from the DHCP server to the wireless client, a first DHCP reply that includes an Internet Protocol (IP) address bound to the stable identifier;

upon receiving, from the wireless client, a second DHCP request that asserts the IP address and a second MAC address due to a MAC address rotation, merging the second MAC address and the IP address into the session context with the stable identifier, and relaying, to the DHCP server, the second DHCP request to include the stable identifier; and relaying, from the DHCP server to the wireless client, a second DHCP reply that includes the IP address bound to the stable identifier.

2. The method of claim 1, wherein:

merging the second MAC address and the IP address into the session context with the stable identifier enables the wireless client to maintain an association to the wireless infrastructure across the MAC address rotation; and the IP address remains assigned to the wireless client and bound to the stable identifier by the DHCP server across the MAC address rotation.

3. The method of claim 1, wherein:

receiving the first DHCP request includes receiving the first DHCP request to include the stable identifier in a device identifier option of the first DHCP request, and relaying the first DHCP request includes relaying the first DHCP request with the device identifier option; and receiving the second DHCP request includes receiving the second DHCP request to include the stable identifier in the device identifier option of the second DHCP request, and relaying the second DHCP request includes relaying the second DHCP request with the device identifier option.

4. The method of claim 1, further comprising:

upon receiving the first DHCP request, generating the stable identifier and first inserting the stable identifier into the first DHCP request before relaying the first DHCP request;

recording the IP address asserted in the first DHCP reply; and upon receiving the second DHCP request, recognizing that the second DHCP request originates from the wireless client based on the IP address asserted in the second DHCP request and the IP address as recorded, and second inserting the stable identifier into the second DHCP request before relaying the second DHCP request.

5. The method of claim 4, wherein:

first inserting includes inserting the stable identifier into a device identifier option of the first DHCP request; and second inserting includes inserting the stable identifier into the device identifier option of the second DHCP request.

6. The method of claim 5, wherein the device identifier option is device identifier option 1 of DHCP IP version 6 (DHCPv6).

7. The method of claim 5, wherein the device identifier option is device identifier option 61 of DHCP IP version 4 (DHCPv4).

8. The method of claim 4, wherein:
first inserting includes overwriting the first MAC address of the first DHCP request with the stable identifier to present the stable identifier to the DHCP server as a stable MAC address; and
second inserting includes overwriting the second MAC address of the second DHCP request with the stable identifier to present the stable identifier to the DHCP server as the stable MAC address.

9. The method of claim 1, wherein:
the DHCP server is configured to implement DHCP for IP version 6 (DHCPv6); and
the first DHCP request, the first DHCP reply, the second DHCP request, and the second DHCP reply are a DHCPv6 solicit, a DHCPv6 reply, a DHCPv6 request, and a DHCPv6 acknowledge, respectively.

10. The method of claim 1, wherein:
the DHCP server is configured to implement DHCP for IP version 4 (DHCPv4);
when the first DHCP request is a DHCPv4 discover or a DHCPv4 request, the first DHCP reply is a DHCPv4 offer or a DHCPv4 acknowledge, respectively; and
the second DHCP request and the second DHCP reply are respectively a DHCPv4 request and a DHCPv4 acknowledge.

11. The method of claim 1, further comprising, at the DHCP server:
upon receiving the first DHCP request relayed by the wireless infrastructure, assigning the IP address to the wireless client, recording a DHCP binding that maps the stable identifier to the IP address, and sending the first DHCP reply to the wireless infrastructure; and
upon receiving the second DHCP request relayed by the wireless infrastructure, extending a lease of the IP address to the wireless client based on the stable identifier asserted in the second DHCP request, maintaining the DHCP binding that maps the stable identifier to the IP address, and sending, to the wireless client, the second DHCP reply to include the IP address.

12. An apparatus comprising:
a network input/output interface to communicate with one or more networks; and
a processor implemented in a wireless infrastructure configured to communicate with a dynamic host configuration protocol (DHCP) server and a wireless client that rotates its media access control (MAC) address, the processor coupled to the network input/output interface and configured to perform:
upon receiving, from the wireless client, a first DHCP request that includes a first MAC address, creating, for the wireless client, a session context that includes the first MAC address and a stable identifier for the wireless client that is stable across MAC address rotations, and relaying the first DHCP request to the DHCP server;
relaying, from the DHCP server to the wireless client, a first DHCP reply that includes an Internet Protocol (IP) address bound to the stable identifier;
upon receiving, from the wireless client, a second DHCP request that asserts the IP address and a second MAC address due to a MAC address rotation, merging the second MAC address and the IP address into the session context with the stable identifier, and relaying, to the DHCP server, the second DHCP request to include the stable identifier; and
relaying, from the DHCP server to the wireless client, a second DHCP reply that includes the IP address bound to the stable identifier.

13. The apparatus of claim 12, wherein:
the processor is configured to perform merging the second MAC address and the IP address into the session context with the stable identifier to enable the wireless client to maintain an association to the wireless infrastructure across the MAC address rotation; and
the IP address remains assigned to the wireless client and bound to the stable identifier by the DHCP server across the MAC address rotation.

14. The apparatus of claim 12, wherein:
the processor is configured to perform receiving the first DHCP request by receiving the first DHCP request to include the stable identifier in a device identifier option of the first DHCP request, and relaying the first DHCP request includes relaying the first DHCP request with the device identifier option; and
the processor is configured to perform receiving the second DHCP request by receiving the second DHCP request to include the stable identifier in the device identifier option of the second DHCP request, and relaying the second DHCP request includes relaying the second DHCP request with the device identifier option.

15. The apparatus of claim 12, wherein the processor is further configured to perform:
upon receiving the first DHCP request, generating the stable identifier and first inserting the stable identifier into the first DHCP request before relaying the first DHCP request;
recording the IP address asserted in the first DHCP reply; and
upon receiving the second DHCP request, recognizing that the second DHCP request originates from the wireless client based on the IP address asserted in the second DHCP request and the IP address as recorded, and second inserting the stable identifier into the second DHCP request before relaying the second DHCP request.

16. A method comprising:
at a wireless infrastructure configured to support stateless address autoconfiguration (SLAAC) Internet Protocol (IP) address assignment to a wireless client hosted on an subnet and configured to rotate its media access control (MAC) address:
upon observing a packet sent by the wireless client to the subnet for duplicate address detection, the packet including a link local address and a first MAC address, recording a mapping of the first MAC address to the link local address in a session context for the wireless client;
upon observing a router advertisement from a router advertising a subnet prefix for the subnet, computing a global IP address based on the subnet prefix and the link local address, and recording a mapping of the first MAC address to the global IP address in the session context; and
upon observing data packets sent by the wireless client to the router and that include a second MAC address due to a MAC address rotation, the link local address, and the global IP address, recording a mapping of the second MAC address to the link local address and the global IP address in the session context, to persist the session context across the MAC address rotation.

17. The method of claim 16, wherein the link local address is randomly generated by the wireless client to be stable across the MAC address rotation.

18. The method of claim 16, wherein observing the data packets includes:
    observing a first data packet that includes the second MAC address and the link local address, but not the global IP address;
    observing a second data packet that includes the second MAC address and the global IP address; and
    recording the mapping of the second MAC address includes recording the mapping of the second MAC address responsive to observing the first data packet and the second data packet.

19. The method of claim 18, wherein recording the mapping of the second MAC address further includes:
    recording a first mapping of the second MAC address to the link local address based on the first data packet; and
    recording a second mapping of the second MAC address to the global IP address based on the first data packet.

20. The method of claim 16, wherein the SLAAC IP address assignment is for an IP version (v) 6 (IPv6) address.

* * * * *